US011580170B2

(12) United States Patent
Wang et al.

(10) Patent No.: US 11,580,170 B2
(45) Date of Patent: Feb. 14, 2023

(54) MACHINE LEARNING BASED AUTOMATIC AUDIENCE SEGMENT IN AD TARGETING

(71) Applicant: Google LLC, Mountain View, CA (US)

(72) Inventors: Xuerui Wang, Mountain View, CA (US); Daniel Li, Mountain View, CA (US); Xiaodan Song, Mountain View, CA (US); Jie Han, Mountain View, CA (US); Rahul Sharma, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 296 days.

(21) Appl. No.: 16/670,809

(22) Filed: Oct. 31, 2019

(65) Prior Publication Data

US 2020/0142930 A1    May 7, 2020

Related U.S. Application Data

(60) Provisional application No. 62/754,372, filed on Nov. 1, 2018.

(51) Int. Cl.
*G06F 16/906* (2019.01)
*G06F 16/215* (2019.01)
*G06K 9/62* (2022.01)

(52) U.S. Cl.
CPC .......... *G06F 16/906* (2019.01); *G06F 16/215* (2019.01); *G06K 9/6223* (2013.01)

(58) Field of Classification Search
CPC ... G06F 16/906; G06F 16/215; G06K 9/6223; G06K 9/6284
See application file for complete search history.

(56) References Cited

U.S. PATENT DOCUMENTS 6,618,722 B1 * 9/2003 Johnson .............. G06F 16/3338
   707/999.005
8,793,238 B1 * 7/2014 Carver ................. G06F 16/355
   707/708

(Continued)

FOREIGN PATENT DOCUMENTS

JP    2008084203 A  *  4/2008

OTHER PUBLICATIONS

Google Patents English Language Translation of Tsuchida (Year: 2008).*

(Continued)

*Primary Examiner* — Apu M Mofiz
*Assistant Examiner* — Farhad Agharahimi
(74) *Attorney, Agent, or Firm* — Dority & Manning, P.A.

(57) ABSTRACT

Generating granular clusters for real-time processing is provided. The systems can identify tokens based on aggregating input from computing devices over a time interval. The systems can identify, based on metrics, a subset of tokens for cluster generation. The systems can generate, via a clustering technique, token clusters from the subset of the tokens, each of the token clusters comprising two or more tokens from the subset of the tokens. The systems can apply a de-duplication technique to each of the token clusters. The systems can apply a filtering technique to the token clusters to remove tokens erroneously grouped in a token cluster. The systems can assign, based on a selection process, a label for each of the token clusters. The systems can activate, based on a number of remaining tokens in each of the token clusters, a subset of the token clusters for real-time content selection.

19 Claims, 5 Drawing Sheets

(56) References Cited

U.S. PATENT DOCUMENTS

| | | | |
|---|---|---|---|
| 2012/0158487 A1 | 6/2012 | Ogawa | |
| 2013/0254190 A1* | 9/2013 | Nakano | G06F 16/3322 707/727 |
| 2014/0244611 A1* | 8/2014 | Krishnapuram | G06F 16/951 707/706 |
| 2016/0125456 A1 | 5/2016 | Wu et al. | |
| 2017/0243404 A1* | 8/2017 | Morales | G06T 17/00 |
| 2018/0349388 A1* | 12/2018 | Skiles | G06N 20/10 |
| 2019/0068171 A1* | 2/2019 | Li | H03H 21/0043 |

OTHER PUBLICATIONS

Barai ("Outlier Detection and Removal Algorithm in K-Means and Hierarchical Clutering", World Journal of Computer Application and Technology, pp. 24-29, 2017) (Year: 2017).*

Google, Inc., "About audience targeting", https://doc-0k-5k-apps-viewer.googleusercontent.com/viewer-corp/secure/pdf/mnhu5igd8eecutg6kidpif9emgvnqlc4/t0sqtojqsh1g3jtuihquek9b6uakhn51/1633102200000/drive/11725426413458434976/ACFrOgCHQhfv2rHKWpC4FM24d4mE4MeWp8oECRacyt0S3WouAR8A0_LkL2beVcyUvHCjMe_iy7R1EPCV9OnkvJwF4GF8i2Lhs7JfAieG-zbS6K2EmdqxBl7uoYm-YMwAz8F7_zyseuXVsfjET07D?print=true&nonce=qctpchnbejc6i&user=11725426413458434976&hash=qh2bf7pfc7btqmblnqq0cnsi6h9igvvd, downloaded Sep. 26, 2018, 4 pages.

Thomaidou, "Automated Creation and Optimization of Online Advertising Campaigns", Athens University of Economics and Business, Ph.D Thesis, Oct. 2014, 151 pages.

\* cited by examiner

MACHINE LEARNING BASED AUTOMATIC AUDIENCE SEGMENT IN AD TARGETING

CROSS-REFERENCES TO RELATED APPLICATIONS

This application claims the benefit of priority under 35 U.S.C. § 119 to U.S. Provisional Patent Application No. 62/754,372, filed Nov. 1, 2018, which is hereby incorporated by reference herein in its entirety.

BACKGROUND

Information technology infrastructure can process data packets received over a network to select content items for delivery to client computing devices. However, due to the large amount of selection criteria that is processed to select content items, and the real-time nature of content item selection, it can be challenging to effectively and efficiently select content items responsive to receiving data packets without introducing delay and latency.

SUMMARY

This technical solution is directed to generating granular clusters for real-time processing. The technology can include a system that efficiently processes a large set of tokens using a metric-based model generated via a machine learning technique to generate subsets of tokens. The system can then apply one or more filtering and processing techniques to form granular clusters with tokens. The granular clusters can be input into a real-time selection processing technique, as opposed to the initial large set of tokens, thereby resulting in reducing computing resource utilization and memory utilization by the system.

At least one aspect is directed to systems of granular clusters generation for real-time processing. The systems can include a data processing system. The data processing system can include one or more processors and memory. The data processing system can include an interface, token extractor, token evaluator, cluster generator, post-processor, label generator, cluster activator, content selector, or a data repository. The data processing system can identify a plurality of tokens based on aggregating input received via a network from a plurality of computing devices over a time interval. The data processing system can identify, based on a plurality of metrics, a subset of the plurality of tokens for cluster generation. The data processing system can generate, via a clustering technique, a plurality of token clusters from the subset of the plurality of tokens, each of the plurality of token clusters comprising two or more tokens from the subset of the plurality of tokens. The data processing system can apply a de-duplication technique to each of the plurality of token clusters. The data processing system can apply a filtering technique to the plurality of token clusters to remove tokens erroneously grouped in a token cluster of the plurality of token clusters. The data processing system can assign, based on a selection process, a label for each of the plurality of token clusters. The data processing system can activate, based on a number of remaining tokens in each of the plurality of token clusters, a subset of the plurality of token clusters for real-time content selection via the network.

At least one aspect is directed to methods of granular clusters generation for real-time processing. The methods can be performed by a data processing system having one or more processors and memory. The methods can include the data processing system identifying a plurality of tokens based on aggregating input received via a network from a plurality of computing devices over a time interval. The methods can include the data processing system identifying, based on a plurality of metrics, a subset of the plurality of tokens for cluster generation. The methods can include the data processing system generating, via a clustering technique, a plurality of token clusters from the subset of the plurality of tokens, each of the plurality of token clusters comprising two or more tokens from the subset of the plurality of tokens. The methods can include the data processing system applying a de-duplication technique to each of the plurality of token clusters. The methods can include the data processing system applying a filtering technique to the plurality of token clusters to remove tokens erroneously grouped in a token cluster of the plurality of token clusters. The methods can include the data processing system assigning, based on a selection process, a label for each of the plurality of token clusters. The methods can include the data processing system activating, based on a number of remaining tokens in each of the plurality of token clusters, a subset of the plurality of token clusters for real-time content selection via the network.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
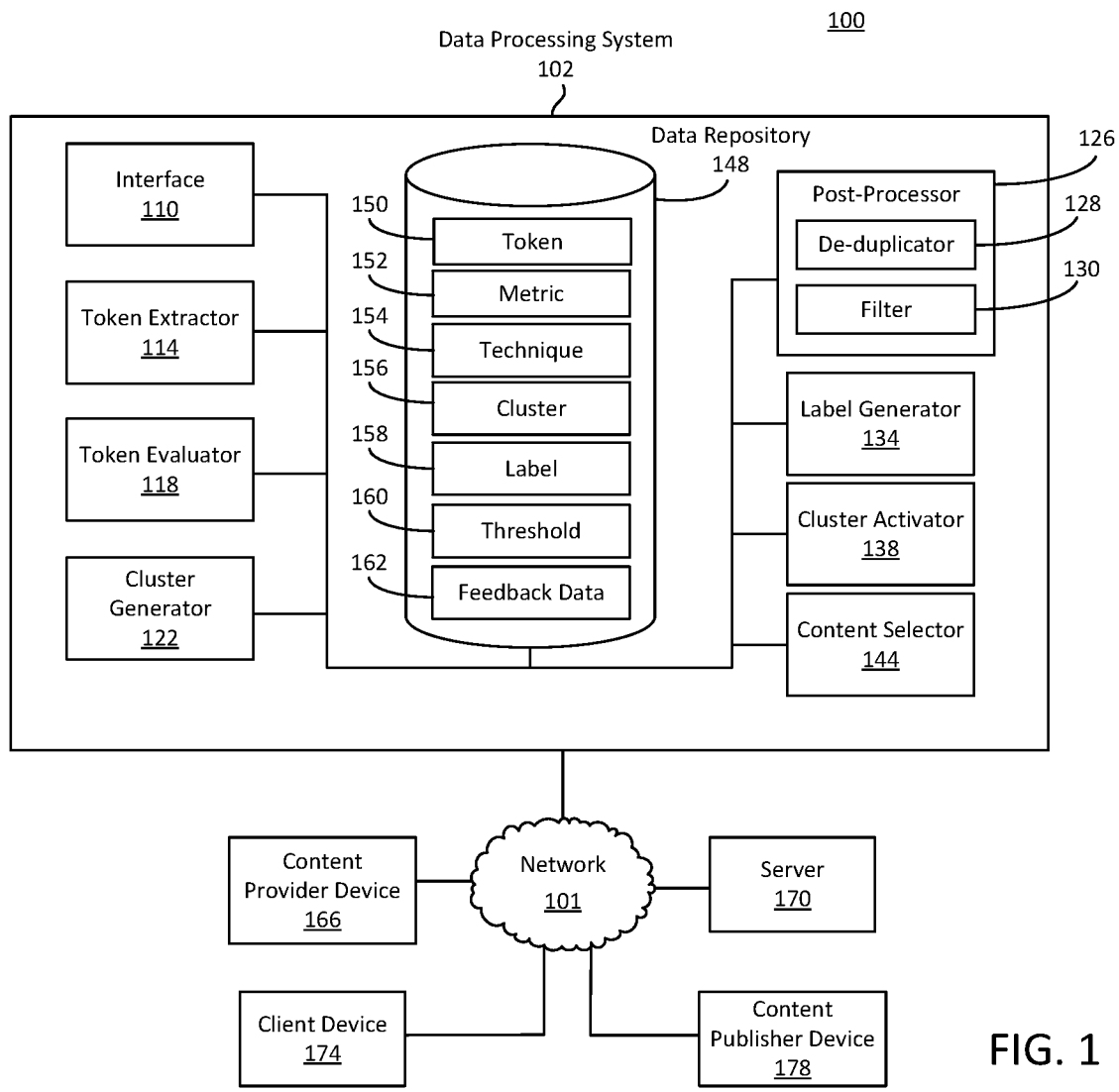
FIG. 1 is a block diagram depicting an example system of granular clusters generation for real-time processing, in accordance with an implementation.

Some or all of the figures are schematic representations for purposes of illustration. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

DETAILED DESCRIPTION

This technical solution is directed to generating granular clusters for real-time processing. For example, content providers (or third-party content providers) can provide digital components content items (or third-party content) for display within information resources (e.g., websites, web or mobile applications, gaming platforms, maps) on client devices based on content selection criteria. The content provider can select or identify content selection criteria including, for example, keywords (or tokens) or information resources. The keywords can be associated with a candidate impression, and the system can use the keywords to select content items to display for the impression.

However, it can be challenging to efficiently and effectively select content items during a real-time content selection process due to the large number of selection criteria. To reduce latency and delay associated with the selection process, while improving the accuracy and reliability of the content item selection, this technical solution can processes a large set of tokens using a metric-based model generated via a machine learning technique to generate subsets of tokens. The system can then apply one or more filtering and processing techniques to form granular clusters with tokens. A content provider can activate a granular clusters for input into a real-time selection processing technique, as opposed to the initial large set of tokens, thereby resulting in reducing computing resource utilization and memory utilization by the system.

For example, broad clusters may not adequately and accurately represent specific, desired selection criteria for a third-party content provider. Furthermore, clusters may be static and lack the capability to update based on new keywords or contexts.

This technical solution is directed to automatic and data-driven mechanisms for generating token clusters via machine learning. Such data can include a large numbers of tokens (e.g., keywords, information resource identifiers, device identifiers or other potential content serving criteria), historic performance data (e.g., client device interaction rate or conversion) for various tokens, historic search queries, content of (or associated with) information resources, other online-available data, or a combination thereof. This technology can generate clusters with improved granularity (e.g., compared to previously existing segments) in representing client devices that third-party content providers seek to reach. Adequate granularity can refer to clusters (or the respective sets of tokens) that reach intended client devices, without reaching unintended or non-relevant client devices. This technology can generate clusters that reach desired client devices with relatively fewer tokens, therefore resulting in efficient usage of memory and computation resources. The mechanisms described herein also allow for automatic disambiguation of keywords (or tokens).

A data processing system can generate segments (e.g., clusters of tokens that reach desired client devices) by clustering similar or related keywords, clustering relevant information resource identifiers on which to present content items, or clustering client device information (e.g., IP addresses, page visit, content items displayed, etc.) on which to potentially display content items. For clustering purposes, techniques described herein employ machine learning, for example, to define (or identify) similarity features and similarity techniques for measuring similarities between a pair of tokens or pair of segments. The problem of defining features (or metrics) for measuring tokens' similarity is an extremely high dimensional and extremely sparse problem to solve given that the similarity measures are meant (or intended) to emulate how tokens are perceived The data processing system can use a clustering model, generated using unsupervised machine learning, to cluster input data (e.g., a large number of keywords) into segments. The clustering (or the generating of the clustering model) may not involve using labeled training data, but rather segments are created when patterns or features of the input collectively suggest existence of such segments. The data processing system can provide generated segments for access by third-party content providers. The data processing system can, for example, allow third-party content providers to search and/or select generated segments, provide a hierarchical browsing system, or actively recommend generated segments to third-party content providers. For instance, the data processing system can access content (e.g., web age or client application content), query logs, or other data associated with a third-party content provider, and retrieve therefrom keywords (or tokens) that accurately represent a custom intent of the third-party content provider. The data processing system can then use the retrieved keywords (or tokens) to identify one or more segments from the generated segments (e.g., by comparing retrieved keywords (or tokens) to names or keywords (or tokens) of various generated segments) for recommending to the third party content provider. While the description that follows uses keywords as a building block of the mechanisms or techniques described herein, the same technique can be used equally effectively with other tokens, such as URLs, mobile or web application identifiers (or features), device identifiers or features, social media accounts, geographical locations, other places a client device visited, etc.

In situations in which the systems discussed here collect information about client devices, or may make use of information, the client devices may be provided with an opportunity to control whether programs or features collect client device information (e.g., information about a client device social network, social actions or activities, profession, client device preferences, or a client device location), or to control whether or how to receive content from the content server that may be more relevant to the client. In addition, certain data may be treated in one or more ways before it is stored or used, so that personally identifiable information is removed. For example, a client device identity may be treated so that no personally identifiable information can be determined for the client device, or a geographic location of the client device may be generalized where location information is obtained (such as to a city, ZIP code, or state level), so that a particular location of a client device cannot be determined. Thus, the client may have control over how information is collected about the client device and used by a server (or content server).

The present disclosure is generally directed to using machine learning to generate segments used for content selection. The total amount of content serving criteria maintained in association with content providers can impact the amount of memory resources and computational resources used by content selection system, and the amount of processing performed when handling requests for content items. A content selection system uses keywords or in-market categories for content selection. Keywords tend to be fine-grained, which results in content providers having to employ a large number of keywords or keyword expansion techniques to reach a desired client device. Furthermore, keywords can be ambiguous and result in erroneous content selection. In-market categories, however, are coarse-grained and there are a very limited number of categories (e.g., 500 categories).

Systems and methods of this technical solution provide a framework for automatic, data-driven segment generation. The system can identify a set of keywords to be used for cluster generation by balancing six different metrics (e.g., coherence, granularity, coverage, stability, freshness, and readability). The system can cluster the identified keywords into segments based on a clustering technique, such as hierarchical agglomerative clustering. After generating the clusters, the system can apply multiple de-duplication techniques than range from conservative to aggressive. The system can then filter the clusters by removing erroneous keywords that have a low level of similarity to other keywords in the cluster and assign a name to the segment.

To configure a content provider campaign, the content provider can select a segment. For example, the content provider can select a segment as a criteria, and the content selection system can match client device tagged with one or more of the listed keywords in that segment.

Example segments followed by the keywords in the segment:
[pulmonologists]: pulmonologists, lung doctor, pulmonology, lung specialist, pulmonary care, pulmonary doctor, pulmonary disease specialists
[star lord]: example_character_1, example_actor_1, example_star_lord_movie
[babysitter]: babysitter, babysitter jobs, needed babysitter, babysitter app, babysitter site, babysitter wanted
[precious metal trading websites]: example_gold_site_1, example_gold_site_2, example_gold_site_3, example_metal_trade, example_metal_reserve_1, example_metal_reserve_2
[dr house]: house, example_house_related_show, example_house_scripts, example_house_movie, example_house_story
[the tile app]: tile, tile tracker, tile mate, tile inc, find tile, buy tile, tile style, tile key finder FIG. 1 depicts a block diagram of an example system to generate granular clusters for real-time processing. The system 100 can include at least one data processing system 102 that can automatically generate granular clusters in a data-driven manner. A cluster can refer to a group of tokens or keywords that have a similar meaning or are otherwise related to one another. Clusters can be referred to as token clusters, segments, groups, nodes, or categories. The system 100 can include at least one network 101, at least one content provider device 166 (e.g. content provider or content provider computing device), at least one server 170, at least one client device 174 (or client computing device), and at least one content publisher device 178 (or content publisher). The data processing system 102 can include at least one interface 110, at least one token extractor 114, at least one token evaluator 118, at least one cluster generator 122, at least one post-processor 126, at least one label generator 134, at least one cluster activator 138, at least one content selector 144, and at least one data repository 148. The post-processor 126 can include at least one de-duplicator 128 and at least one filter 130. The data processing system 102 can include hardware or a combination of hardware and software such as communications buses, circuitry, processors, communications interfaces, among others. The data processing system 102 can reside on or within a computer, a server, a server farm, a machine farm, or a cloud (e.g., one or more remote devices, servers, or systems). A content provider device 166, a server 170, and a client device 174 can be in communication with the data processing system 102 via a network 101, such that the data processing system 102 can be remote to the content provider device 166, the server 170, and the client device 174.

The data repository 148 can include, store, maintain, or otherwise manage one or more data files, databases, data structures, or other information to facilitate generating clusters for real-time processing. For example, the data repository 148 can include tokens 150, metrics 152, techniques 154, clusters 156, labels 158, thresholds 160, and feedback data 162. Tokens 150 can refer to or include keywords used to select content items during a real-time content selection process. Metrics 152 can refer to or include evaluation metrics used to evaluate tokens in order to determine whether a token is suitable for inclusion in a cluster. Example metrics 152 can include coherence, granularity, coverage, stability, freshness, or readability. Techniques 154 can include clustering, filtering or other processing techniques used to generate granular clusters for real-time processing.

The system 100 can include a network 101. The network 101 can include computer networks such as the Internet, local, wide, metro, or other area networks, intranets, satellite networks, and other communication networks such as voice or data mobile telephone networks. The network 101 can be used to access information resources such as web pages, web sites, domain names, or uniform resource locators that can be displayed on at least one content provider device 166 or client device 174, such as a laptop, desktop, tablet, personal digital assistant, smart phone, or portable computers. For example, via the network 101 a client device 174 can access web pages residing in the server 170 provided by at least one web site operator or content publisher 178. In this example, a web browser of the client device 174 can access a web server of the web site operator or content publisher 178 to retrieve a web page for display on a monitor of the client device 174. The web site operator or content publisher 178 generally includes an entity that operates the web page. In some cases, the web site operator or content publisher 178 can include at least one web page server that communicates with the network 101 to make the web page available to the client device 174.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include a server 170. The server 170 can be interconnected with the data processing system 102 via the network 101. In some cases, the data processing system 102 can include the server 170. For example, the data processing system 102 can include servers 170 located in at least one data center. The data processing system 102 can include multiple, logically grouped servers and facilitate distributed computing techniques. The logical group of servers may be referred to as a server farm or a machine farm. The servers 170 can also be geographically dispersed. A machine farm may be administered as a single entity, or the machine farm can include machine farms. The servers 170 within each machine farm can be heterogeneous—one or more of the servers 170 or machines can operate according to one or more type of operating system platform.

Servers 170 in the machine farm can be stored in high-density rack systems, along with associated storage systems, and located in an enterprise data center. For example, consolidating the servers 170 in this way may improve system manageability, data security, the physical security of the system, and system performance by locating servers 170 and high-performance storage systems on localized high-performance networks. Centralizing the servers 170 and storage systems and coupling them with advanced system management tools allows more efficient use of server resources.

The server 170 can provide access to websites on the server for a content provider device 166, a client device 174, or a content publisher device 178. The web sites of the server 170 can include or maintain at least one banner, image, links, or other content items posted by the content publisher device 178. The server 170 can be configured, in accessible portions, by the content publisher device 178. For example, the content publisher device 178 can publish at least one additional or replace one or more content items within a web page. In other example, the web page of the server 170 can allow the content provider device 166 or the client device 174 to interact with various content items provided by the content publisher device 178.

Additionally, the system 100 can include a content publisher device 178 that communicate with or is interconnected with the components of the system 100 via the network 101. In one example, the content publisher device 178 can provide content items to at least a content provider device 166 and a client device 174 via web pages access provided by at least one web site operator or content publisher 178. In this example, a web browser of the client device 174 can access a web server of the web site operator or content publisher 178 to retrieve a web page for display on a monitor of the client device 174. The web site operator or content publisher 178 generally includes an entity that operates the web page. In some cases, the web site operator or content publisher 178 can include at least one web page server that communicates with the network 101 to make the web page available to the client device 174.

The data processing system 102 can include an interface 110. The interface 110 can include one or more components, ports, hardware, or software interfaces. The interface 110 can include an input interface or an output interface. For example, the interface 110 can include or interface with an input device 830, display 835, or speaker. The interface 110 can be interconnected with various other components of the data processing system 102. The interface 110 can be designed, configured, constructed, or operational to receive and transmit information. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components. The interface 110 can be designed, constructed, or operational to communicate with one or more content provider device 166, server 170, or client device 174 via the network 101 to collect or receive information.

The interface 110 can receive tokens from various sources. For example, the interface 110 can receive tokens from one or more of the content provider devices 166, the server 170, the client device 174, or the content publisher device 178 via the network 101. The token extractor 114 can identify the tokens received via interface 110 and store the tokens in a token data structure 150 in data repository 148. The interface 110 can receive the tokens from at least one content provider via the content provider device 166, at least one web content via the server 170, or at least one search query input by the client device 174. For example, the interface 110 can receive tokens provided by the content provider 166. The tokens can correspond to various content items associated to the content provider 166. The content items can include text, terms, symbols, or metadata that can include tokens or be associated with tokens. The interface 110 can receive tokens from web content accessed the content provider device 166 or the client device 174. The tokens of the web content can include, for example, title, html link, text, description, image, or other exemplary residing in a website. In another example, the interface 110 can receive tokens from search queries performed by the client device 174 via a search engine.

The interface 110 can include an LCD display. The LCD display of the interface 110 can include a graphical user interface ("GUI") which can be used display tokens or clusters of tokens to at least one content provider 166. The interface 110 can maintain or update processes of components of the data processing system 102 based on the received or transmitted information via the network 101. The interface 110 can further include one or more ports for external connection, such as a serial port, USB port, display port, Ethernet port, or Bluetooth receiver and transmitter.

The data processing system 102 can include a token extractor 114. The token extractor 114 can be interconnected with various other components of the data processing system 102. The token extractor 114 can identify tokens by aggregating and parsing input received from multiple data sources via the network 101. The data sources can include the content provider device 166, the server 170, or the client device 174. The token extractor 114 can identify tokens received within a time interval, such as a particular day, week, month, quarter, season (e.g., summer, autumn, winter, or spring), event (e.g., product launch event, holiday, current event, naturally occurring event), year, or two years interval. The token extractor 114 can identify tokens received from each of the data sources and aggregate the tokens for storage in the token data structure 150. The token extractor 114 can extract the tokens received by the interface 110 and store the tokens in a token data structure 150.

The token data structure 150 can include, store or maintain tokens for granular clusters generation. The tokens can be referred to as keywords, information resource identifiers, device identifiers, or other potential content serving criteria. The tokens can link to content items associated with the content provider device 166. The token data structure 150 can include various information associated to the tokens. The information associated to the tokens can include, for example, timestamps, date stamps, IP address associated with each token, definition of the token, character count, or other related token information. For example, the data processing system 102 can receive an input token from the client device 174 via the network 101 through the interface 110. The data processing system 102 can receive information related to the client device and the input token, such as an IP address of the client device 174 and the character count of the input token. The data processing system 102 can associate the information to the input token. The data processing system 102 can store the token received from the client device 174 to the token data structure 150.

The token extractor 114 can parse digital content, data feeds, data streams or other information received, intercepted, or otherwise obtained by the data processing system 102 in order to identify tokens or keywords. The token extractor 114 can parse profiles or content campaigns established by content providers # to identify, extract, or generate tokens. The token extractor 114 can parse accounts associated with client computing devices 174 to identify tokens. The token extractor 114 can obtain and parse data feeds such as RSS data feeds, news data feeds, or current event data feeds to identify tokens or keywords.

The token extractor 114 can perform various types of parsing or processing on the received data in order to identify tokens. For example, the token extractor 114 can include a vocabulary or dictionary containing predetermined tokens that are suitable for extraction. The token extractor 114 can use a semantic processing technique to parse input data to identify tokens or keywords for extraction. The token extractor 114 can be configured with a heuristic technique, rules, templates or other policies used to identify tokens or keywords contained in the input data. Thus, the token extractor can identify tokens based on various types of parsing or processing on the received data.

In some cases, the token extractor 114 can use one or more metrics stored in the metric data structure 152 to store at least one received tokens in the token data structure 150 for evaluation by the token evaluator 118. In some other cases, the token extractor 114 can use the metrics to dismiss or abandon one or more tokens to reduce the number of tokens for evaluation. For example, the token extractor 114 can extract the tokens received via the interface 110 to store in the token data structure 150 using a readability metric store in the metric data structure 152. The token extractor 114 can use the readability metric to determine, for example, one or more tokens are misspelled, visible incoherence tokens, or if there is a duplicated or near-duplicated token in the token data structure 150. In another example, the token extractor 114 can determine not to extract unidentifiable tokens. The unidentifiable tokens can refer to tokens without definition, tokens not in the dictionary, or tokens containing random characters, for example, "asdfafj;kljf".

In another example, the token extractor 114 can extract or store tokens received via the interface 110 based on the determination that the token is relevant to a content provider 166. The token evaluator 118 can use the tokens for evaluation to include in a cluster. In some cases, the token extractor 114 can determine to dismiss or abandon one or more token not relevant to the content provider 166 based on at least one metric to reduce the number of tokens for evaluation. The relevancy of the token to the content provider 166 can be based on the content provider information, such as a campaign strategy, product information, historical token selected (or feedback data 162), or other operation related information.

The data processing system 102 can include a token evaluator 118 (or token evaluation component) designed, constructed and operational to identify, based on metrics, a subset of the tokens to use to generate clusters. The token evaluator 118 can be interconnected with various other components of the data processing system 102. The token evaluator 118 can identify a subset of the tokens for cluster generation, based on metrics stored in the metric data structure 152. The subset can be referred to, and used interchangeably with other descriptive terms, such as group, portion, subcategory, component, part, or fraction. In some cases, the subset can include some or all of the tokens identified and extracted by the token extractor 114. The token evaluator 118 can obtain, receive, or configure tokens stored in the token data structure 150. For example, the token evaluator 118 can replace, remove, or retain one or more tokens based on at least one metric. The metrics can be referred to as an evaluation metrics.

In further details, the token evaluator 118 can utilize the token data structure 150 to store, maintain, or sort the tokens based on the information provided with each token. The token evaluator 118 can sort the tokens maintained in the token data structure 150 based on the timestamps, date stamps, the IP address, or in an alphabetical order. The token evaluator 118 can sort the tokens, for example, to expedite the process of applying metrics 152 for token evaluation. For example, the token evaluator 118 can determine to use a freshness metric to evaluate the token freshness (e.g. newness, recent immerging tokens, etc.). The token evaluator 118 can rearrange or sort the tokens maintained in the token data structure 150 using the timestamps or date stamps based on the determination to use the freshness metric. The token evaluator 118 can further sort the tokens in a forward or reverse order, such as from new to old, old to new, alphabetical "a" to "z", "z" to "a", geographically nearest to farthest, or farthest to nearest. The token data structure 150 can include the geography information of each token based on the IP address received (e.g. via an interface 110) from the client device 174.

The token evaluator 118 can use metrics such as a coherence metric, a granularity metric, a coverage metric, a stability metric, a freshness metric, or a readability metric. The token evaluator 118 can use the coherence metric to evaluate one or more tokens based on at least one template on spend weighted sampled segments to determine the coherency of the cluster of tokens. The template can be provided, for example, to the client device 174 responsive to the interface 110 receiving a search query. The spend weighted sampled segments can refer to one or more clusters of tokens provided to, for example, the client device 174 for evaluation. Each token can include a bid value (or weighted by spending) to determine if the tokens in a cluster are coherent to the client device 174 search queries. For example, the client device 174 can input a token "Vehicle_Brand_1" into a search engine of a server 170 interconnected to the data processing system 102. The data processing system 102 can receive the token via the interface 110, perform processes of components within the data processing system 102 to provide a content item via content selector 144. The content item can include an image, a banner, or a link associated with "Vehicle_Brand_1car", "Vehicle_Brand_1bike", "Vehicle_Brand_1motorcycle", or other "Vehicle_Brand_1" related tokens or clusters selected by a content provider 166. The data processing system 102 can provide a template concurrent to transmitting the content item to the client device 174. The client device can interact with the template to provide a feedback to the data processing system 102, which can be stored in the feedback data structure 162. The token evaluator 118 can evaluate tokens based on the template interacted with the client device 174 to gauge the accuracy of the content item to the client device 174 search query for an determining an impression of transmitted content item associated with clusters or tokens. In one example, the template can evaluate the cluster of tokens based on historical data associated to the client device 174, such as historical searches, previous sites visited, timestamps, date stamps, IP address, mouse hover, site visit duration, or other related search information.

The token evaluator 118 can use the granularity metric to evaluate the granularity of each token in a cluster based on a token-cluster (or keyword-segment) ratio. Each cluster (or segment) can include various numbers of tokens. The token-cluster ratio can refer to a number of tokens in a cluster, which can determine a cluster size or a distribution of cluster sizes for clusters stored in the cluster data structure 156. For example, the token evaluator 118, using a granularity metric, can evaluate a cluster to be a low granularity cluster based on a high number of tokens. On the contrary, the token evaluator 118 can evaluate a cluster to be a high granularity cluster based on a low number of tokens. The high or low number can refer to a number exceeding, not exceeding, or equal to a threshold value. The threshold value can include various ranges of values, such as 3, 6, 9, 12, etc. In some cases, the token evaluator 118 using the granularity metric can evaluate the granularity based on the distribution of each cluster size, such as singleton cluster, overpopulated size cluster, cluster size greater than or equal to a predetermined number (e.g. 5, 10, 15, 20, etc.), or other related distribution information.

The token evaluator 118 can use the coverage metric to evaluate tokens based on a revenue covered by the cluster of tokens that is exposable to a content provider 166. The revenue can be defined by, for example, a click-through rate of the tokens or the clusters of tokens, a bid value corresponding to each token, conversion ratio, or other performance elements associated with a content item. The token evaluator 118 can utilize the coverage metric to decide a token (e.g. keyword, vocabulary, text, etc.) to provide in a cluster of tokens and check cluster coverage in international languages. The international languages can include at least Chinese, Japanese, French, Spanish, or any other languages supported by search engines. For example, the token evaluator 118 can include tokens with bid values in a cluster and exclude tokens without bid values based on the coverage metric. The bid values information can be stored in a feedback data structure 162. In some cases, the token evaluator 118 can include tokens without bid values in a cluster.

The token evaluator 118 can use the stability metric to evaluate tokens to form at least one cluster based on a stability of each token. The stability can be based on at least one portion (e.g. revenue-weighted) of tokens or clusters remained across versions, in terms of visible tokens or clusters. The versions can refer to timestamps, date stamps, platforms, seasons, search engines, frequency of occurrence (e.g. occurs 1000 times a day consistently for 4 weeks, 100 times a week for a year, etc.), or other time or device information. For example, the token evaluator 118 can use the stability metric to determine that the tokens or the clusters are stable if the timestamps of the tokens or clusters appeared throughout the year (e.g. January through December), appeared on various operating system platforms (e.g. Operating Systems, Web Browsers, etc.), or appeared on multiple search engine (e.g. Company_1_Search_Engine, se Company_2_Search_Engine, Company_3_Search_Engine, etc.). In another example, token evaluator 118 can use the stability metric to determine that the tokens or the clusters are not stable if the tokens or clusters include a certain timestamps period (appeared only in November, December, etc.), appeared on certain platform (in Company_1_Operating_Systems, but not Company_2_Operating_Systems), or appeared on certain search engine (in Company_1_Search_Engine, but not Company_2_Search_Engine or Company_3_Search_Engine), referring in portions to the previous example. In some cases, the stability metric can maintain tokens or clusters of tokens that remained across versions. In some other cases, the stability metric can maintain tokens or clusters that are distinctive across versions.

The token evaluator 118 can use the freshness metric to evaluate tokens to form at least one cluster based on a freshness (e.g. newness, recent immerging tokens, etc.) of the tokens. The freshness metric can determine the freshness of the tokens based on at least timestamps, date stamps, or time related information of each token. The feature freshness can refer to changes in definition of a token or other time-related pattern. The token freshness can refer to newly immerged tokens, which can be used to capture popular cluster (or segments) to present to the content provider 166. The newly immerged tokens can include, for example, Smartphone_Brand_1_Version_2019, Smartphone_Brand_2_Upcoming_Version, or other immerged tokens due to new fashion, technologies, or trends. By using a freshness metric, the token evaluator 118 can exclude, bock, or prevent stale keywords from being used to form a cluster. Stale keywords may refer to keywords that are not commonly used during a time interval or time period corresponding to the real-time content selection process.

The token evaluator 118 can use the readability metric to evaluate tokens to form at least one cluster based on various erroneous tokens included, stored, or maintained in the token data structure 150. The token evaluator 118 can use the readability metrics to determine various types of erroneous tokens, for example, at least one spelling error, at least one language mismatch (or mix of various languages) in cluster, at least one geography mismatch in cluster, at least one token near-duplications in cluster, at least one visible token incoherence, or cluster duplication. The spelling error can be any typo stored in the token data structure 150, such as an input token of "chrismas tree" instead of "Christmas tree". The language mismatch can refer to mixing different languages in a single search query, such as an input token of "Christmas arbol" with the word "arbol" being "tree" in Spanish. In some cases, the language mismatch in the cluster can refer to the same word but in different languages, such as choce, bil, voiture, or carro, which means "car" in different languages. The geography mismatch in cluster can be based on the IP address associated to the tokens in the cluster, for example and relating back to the language mismatch, each token for "car" in different languages can be associated to different IP addresses. The token near-duplications in cluster can refer to tokens that are similar in appearance or meaning, such as "car", "Car", or "CAR", for example. The visible token incoherence can refer to at least one token that are difficult to understand, or does not include a topic of discussion, such as "it art are gallery", "spray off coat repellant water", or other tokens of the sort. The cluster duplication can refer to clusters with similar or the same labels stored in the label data structure 158. In some cases, the token evaluator 118 can determine to remove at least one duplicated cluster based on at least the tokens included in each cluster or a label associated to the cluster. For example, the token evaluator 118 can remove a cluster with a lower number of tokens or remove a cluster with a lower scored label The token evaluator 118 can evaluate tokens using one or more of these metrics and in any order. The token evaluator 118 can evaluate tokens using metrics in any other order determined to improve the granularity or coherency of the cluster. The token evaluator 118 can determine to use a certain number of metrics for evaluating the tokens of the token data structure 150. For example, the token evaluator 118 can determine to use coherence metric and stability metric, without the granularity metric. In further example, the token evaluator 118 can determine to use granularity metric in succession to the coherence metric. The token evaluator 118 can utilize the one or more metrics in any combination herein.

The token evaluator 118 can determine to maintain one or more tokens in the token data structure 150 based on satisfying one or more metric. In addition, the token evaluator 118 can determine to remove or replace one or more tokens from the token data structure 150 based on not satisfying one or more metrics. The token evaluator 118 can execute one or more tasks in parallel to a cluster generator 122. The token evaluator 118 can evaluate one or more tokens to provide to the cluster generator 122 for generating clusters.

Additionally, the token evaluator 118 can apply a weight to at least one of the metrics. The metrics can include at least two of the coherence metrics, the granularity metric, the coverage metric, the stability metric, the freshness metric, and the readability metric. The weight can refer to a value, significance, or importance of the metric. For example, the token evaluator 118 can determine to apply a weight of 3 for the coherence metric and a weight of 2 for the granularity metric, such that the weight of the coherence metric is greater than the weight of the granularity metric for evaluating each token to generate a cluster. In this case, for example, the token evaluator 118 can evaluate the tokens based on the coherence metric before the granularity metric.

The token evaluator 118 can generate or identify a set tokens based on the weight metrics of the tokens. The token evaluator 118 can determine a score for a token based on a combination of weighted metrics. If the score for a token satisfies a threshold, then the token evaluator 118 can determine to use the token for cluster generation. If, however, a combined score for a token based on weighted metrics does not satisfy a threshold, then the token evaluator 118 can determine to block, prevent, or otherwise not include the token as part of a cluster.

The data processing system 102 can include a cluster generator 122 (or cluster generation component) designed, constructed and operational to generate token clusters from tokens evaluated by the token evaluator 118 to be suitable for cluster generation. The cluster generator 122 can be interconnected with various other components of the data processing system 102. The cluster generator 122 can receive a token from the token evaluator 118. For example, the token evaluator 118 can identify a subset of the tokens. The cluster generator 122 can receive the subset of the tokens to generate one or more clusters. The cluster generator 122 can generate token clusters from the subset of the tokens using various clustering techniques. The clustering techniques can be included, stored, or maintained in a technique data structure 154 of the data repository 148. The cluster generator 122 can arrange, group, or categorize the tokens based on various information provided with the token, such as timestamps, date stamps, IP address, definition, or other related coherence information. Each of the clusters can include two or more tokens from the subset of the tokens. The cluster generator 122 can store the generated clusters in the cluster data structure 156. In some cases, a cluster with one token can be removed from the cluster data structure 156, or merge with an additional cluster to produce two or more tokens per cluster.

The clustering techniques can include, for example, hierarchical agglomerative clustering ("HAC"), K-means clustering, min-max clustering, and ClustOn. The HAC can utilize at least one metric stored in the metric data structure 152 to perform token clustering based on a various variation. The HAC variation can include complete linkage, single linkage, or group average linkage to determine at least one similarity between two or more clusters. The complete linkage can determine the similarity based on a minimum pair-wise token similarity between the two or more clusters. The single linkage can determine the similarity based on a maximum pair-wise token similarity between the two or more clusters. The group average linkage can determine the similarity based on the average pair-wise token similarity between the two or more clusters.

The K-means clustering can be parallelized to cluster tokens into at least one cluster. The K-means clustering can be used for vector quantization, such as to partition at least one observation into at least one cluster. The K-means clustering can be parallelized to cluster tokens into at least one cluster. The K-means clustering can be used for vector quantization, such as to partition at least one observation into at least one cluster.

The min-max clustering can assign a weight to each of the clusters. The highest weighted cluster can be prioritized to provide to at least one content provider 166 and the lowest weighted cluster can be, for example, removed from the cluster data structure 156.

ClustOn can hash data to provide a compromise between the scalability and incremental stability of tokens to assign in a cluster. ClustOn can hash data at varying rate (e.g. speed, volume, etc.), for example, 20K queries-per-second (QPS), 21K QPS, or 30K QPS. ClustOn can include multiple phases for clustering data, such as a burn-in phase and a post-burn-in phase, for example. ClustOn can initiate the burn-in phase to collect various data (or data points) received by the data processing system 102. The burn-in phase can further retrieve the various data stored in the data repository 148. The burn-in phase can terminate collection of data responsive to collecting a predetermined number of data, such as 200, 400, or 800 data points.

ClustOn can initiate the post-burn-in phase responsive to collecting the predetermined number of data. ClustOn can further initiate the post-burn-in phase based on the termination of the burn-in phase. The post-burn-in phase can provide a snapshot of the collected data. The snapshot can refer to an accumulation of collected data, for example within a time period, such as a week, month, or year. The post-burn-in phase can cluster the snapshotted data by assigning or merging each data into its respective cluster, for example, based on similarity between the respective data value and one or more values within a cluster. The cluster can be predetermined or dynamically generated, which can be based on the values of the collected data. For example, the collected data can include values of 10, 12, 15, 50, 51, 54, 90, 93, and 96. ClustOn can determine, based on the collected data in this example, to include cluster A for 10, 12, and 15, cluster B for 50, 51, and 54, and cluster C for 90, 93, and 96. In brief overview, and as an example, ClustOn can collect data, via a first phase, received from the data processing system 102. ClustOn can include cluster A with a value range of 10-15, cluster B with a value range of 50-54, and cluster C with a value range of 90-96, as in the previous example. ClustOn can collect an additional data with a value of 35, for example. ClustOn can assign the additional data to cluster B, based on a comparison between the additional data and the value range of each cluster. In some cases, ClustOn can generate a new cluster, such as cluster D for the additional value, based on a comparison difference. For example, if an additional data value is greater than or less than 10 from each cluster range, ClustOn can generate cluster D and assign the additional data to the cluster D.

The cluster generator 122 can use one or more clustering techniques obtained from the technique data structure 154, and execute the one or more clustering techniques simultaneously, in an overlapping manner, or sequentially in any order. For example, the cluster generator 122 can utilize the K-means clustering without the ClustOn, utilize the min-max clustering, without the K-means, or other combination thereof. The cluster generator 122 can determine to remove at least one cluster based on satisfying or not satisfying one or more techniques. The removal of each cluster can reduce the number of selections for content selector 144 to choose from, which can increase the relevancy of each cluster, and reduce computation resource and memory requirement to provide relevant clusters to the content providers 166.

The cluster generator 122 can generate token clusters based on at least one distance metrics between tokens of the subset of the tokens. The distance metrics can be stored in the metric data structure 152. The distance metrics can include at least SKI similarity metric, word embedding similarity metric, word concept embedding similarity metric, or full match Entity/Phil similarity metric. The SKI similarity metric can form a cluster of tokens or merge a token with at least one cluster based on token similarity. The similarity can be based on a definition, structure, or characters of the token. The word embedding similarity metric can map the token to vectors and real numbers. The word embedding similarity metric can involve mathematical embedding from space with many dimensions per word to a continuous vector space with lowered dimension. The word concept embedding similarity metric can introduce a deep directed acyclic graphical model with features. The features can be used to perform a machine learning technique for the word concept embedding similarity metric. The full match Entity/Phil similarity metric can compare two or more tokens based on a full match of the tokens. The full match can relate to the same definition, text, or other token related information between the two or more tokens. The cluster generator 122 can utilize at least one, or a combination of two or more distance metrics to determine two or more tokens to generate a cluster.

The cluster generator 122 can generate a model using a metric stored in a metric data structure 152. The cluster generator 122 can cluster two or more metrics to generate a single model. In some cases, the cluster generator 122 interconnected to components of the data processing system 102 can train the model using training data. The training data can refer to feedback data (or historical data) stored in the feedback data structure 162. The feedback data can refer to information provided by, for example, the content provider device 166, the client device 174, or the content publisher device 178. The model can be stored, for example, in the metric data structure 152 of the data repository 148. The cluster generator 122 can provide the model to a machine learning engine. The machine learning engine can utilize the model to perform one or more machine learning (e.g., unsupervised) technique. In some cases, the machine learning engine is part of the cluster generator 122. The cluster generator 122 can use machine learning technique to generate a cluster of tokens. The cluster generator 122 can determine (or identify), based on input date, similarity features for use to measure similarities between tokens (or keywords) and/or clusters (or segments). Each similarity feature can be associated with a one or more respective threshold values and/or weighting coefficients that are also determined by the cluster generator 122. The techniques to generate the cluster can include a clustering algorithm, the similarity features together with the corresponding threshold values and/or the weighting coefficients. The cluster generator 122 can receive large number of tokens (e.g., millions), as input, and output large number of clusters (e.g., tens of thousands).

Further examples of segments or clusters generated by Machine Learning can include, for example:

[pulmonologists]: pulmonologists, lung doctor, pulmonology, lung specialist, pulmonary care, pulmonary doctor, pulmonary disease specialists

[star lord]: example_character_1, example_actor_1, example_star_lord_movie

[babysitter]: babysitter, babysitterjobs, needed babysitter, babysitter app, sittercity.com, babysitter wanted

[precious metal trading websites]: example_gold_site_1, example_gold_site_2, example_gold_site_3, example_metal_trade, example_metal_reserve_1, example_metal_reserve_2

[dr house]: house, example_house_related_show, example_housescripts, example_house_movie, example_house_story

[the tile app]: tile, tile tracker, tile mate, tile inc, find tile, buy tile, tile style, tile key finder Additionally, and taking segment with label [pulmonologists] as an example, the data processing system can match client device 174 tagged with all the listed tokens in that segment based on this segment selected by the content provider 166. The content provider 166 may not require manual token creation for inclusion in the segment. The first four example can demonstrate a decrease in dimensionality of a cluster, such as [TV_show_A] or [the tile app]. The [TV_show_A] and [the tile app] segments can demonstrate disambiguated tokens (or keywords) and for expansion to precise segmenting options. The disambiguated tokens can refer to tokens with specific definition corresponding to the label of the segment.

The data processing system 102 can include a post-processor 126 for de-duplicating and filtering one or more tokens from the clusters stored in the cluster data structure 156. The post-processor 126 can be interconnected with various other components of the data processing system 102. The post-processor 126 can include at least one de-duplicator 128 and at least one filter 130. The post-processor 126 can utilize the de-duplicator 128 to apply a de-duplication technique to each of the token clusters. The de-duplication technique can be stored in a technique data structure 154 stored in the data repository 148. The de-duplicator 128 can reduce redundancy and similarity inaccuracies in HAC output by removing at least one token from one or more clusters based on a duplication. The de-duplication techniques can be initiated subsequent to the clustering of tokens. In some cases, the de-duplication techniques can be performed prior to clustering the tokens. The de-duplication techniques can be referred to in the following examples:

(i) White space removal: two keywords with only whitespace difference such as "used cars" and "used cars";

(ii) Bag of tokens removal: two keywords are reordering and/or repeating of the same set of tokens, such as "used cars" and "cars cars used";

(iii) Bag of stemmed tokens removal: similar to (ii), but uses the stemmed tokens, such as "used car" and "used cars";

(iv) Entity removal: if two keywords belong to the same entities such as "nba" and "national basketball association"; and (v) Similar meaning removal: these keywords are considered identical meaning such as "Vehicle_Brand_1_Model_1" and "Model_1".

The post-processor 126 can utilize the filter 130 to apply filtering techniques to the token clusters to remove tokens erroneously grouped in a token cluster of the token clusters. The filtering techniques can be stored in the technique data structure 154. The filtering techniques can also associate with at least one metric stored in the metric data structure 152 or at least one threshold stored in the threshold data structure 160. For example, the filter 130 can filter tokens from token clusters based on a query hits metric or a centroid threshold. The removal of the tokens can reduce the number of tokens for the content selector 144. The filtering techniques can be referred to in following examples:

(i) Query Hits (or query hits metric): if a token's query hits from status of a queue do not match other tokens in the cluster (either language or country), it is filtered;

(ii) Centroid (or centroid threshold): if the similarity of a token to other keywords in the cluster (defined as centroid score) is below certain threshold, it is filtered; and (iii) Policy: tokens that are sensitive or having beaker violation are removed.

The query hits metric can be stored in the metric data structure 152. The query hits from the status of a queue can refer to a match (or non-match) between tokens in a queue to tokens in the token cluster, which can include different language or geography. The centroid can refer to a centroid threshold, which can be stored in a threshold data structure 160. The centroid threshold can assess a similarity level between tokens of the cluster to determine a centroid score. In some cases, one or more lowest centroid scored tokens can be removed from the cluster, such as to reduce the number of tokens in a single cluster. The filter 130 can determine to filter out inappropriate or sensitive tokens using the policy. The inappropriate or sensitive tokens can be predetermined by at least the content provider device 166, the server 170, or the client device 174 based on various feedback data from the feedback data structure 162. The feedback data can be referred to as performance data, historical data, or other descriptive terms relevant to at least one input by one or more computing devices or output for the devices. The post-processor 126 can utilize the feedback data, such as token selection, manual token input, content item selection, or other relevant content provider information (e.g. product, address, company, etc.) for the de-duplicator 128 or the filter 130 to remove at least one token or cluster to provide relevant data to a content provider device 166. The post-processor 126 can utilize client device 174 information, such as search queries, mouse hover, keypress, or other interaction information provided by the client device.

The post-processor 126 applying the de-duplication technique or the filtering technique can be referred to as a selection process. The selection process can be completed based on, for example, completing both the de-duplication and filtering of the tokens from each of the clusters. In some cases, the post-processor 126 can initiate the de-duplicator 128 or the filter 130 to execute their respective technique. The execution can be, for example, subsequent to the generation of the token clusters by the cluster generator 122.

For example, the de-duplicator 128 can apply two or more de-duplication techniques, such as white space removal and bag of tokens removal, bag of stemmed tokens removal and entity removal, or any combination thereof, similar to the token evaluator 118 executing the metrics. Similarly, to the de-duplicator 128, the filter 130 can filter the tokens from the token clusters based on one of the filtering technique, or a combination of filtering techniques.

The data processing system 102 can include a label generator 134. The label generator 134 can be interconnected with various other components of the data processing system 102. The label generator 134 can generate labels to differentiate between each cluster of the clusters. The label can be referred to as, and use interchangeably with other descriptive terms, such as tag, category, name, or identity. The generation of the labels can be based on general definition, concept, or subject of the tokens within each cluster. In some cases, the label can be similar to a token from the tokens for each cluster. For example, a cluster with a label "Car_Make_1" can include tokens associated to the brand "Car_Make_1_Model_1", such as "Car_Make_1_Model_2", "Car_Make_1_Model_1.5", "Car_Make_1_Model_3", "Car_Make_1_Model_5", etc. The label generator 134 can generate the labels responsive executing the de-duplication and filtering by the post-processor 126. The label generator 134 can store the generated labels in the label data structure 158. In one example, the label generator 134 can determine whether a label to generate is a duplicate to a label stored in the label data structure 158. In this example, the label generator 134 can generate a different label to assign a cluster that is not a duplicate of the labels to store in the label data structure 158. In another example, the label generator 134 can identify two or more duplicate labels. The label generator 134 can determine to merge the two or more labels into a single label. In some cases, duplicate labels can identify two or more clusters to merge by the cluster generator 122.

The label generator 134 can assign a label for each of the token clusters stored in the cluster data structure 156 based on a selection process (or the post-processor execution). The label generator 134 can assign the label based on a selection from at least the label data structure 158, one or more tokens associated with each cluster, or one or more tokens provided by at least one content provider 166. In some cases, the label generator 134 can assign a score label for each token within a cluster. Additionally, the label generator 134 can identify candidate labels for each of the token clusters. The candidate labels can be pre-existing labels stored in the label data structure 158 or generated labels. The label generator 134 can select at least one candidate label to provide to each of the clusters.

In some cases, the label generator 134 can determine a score for each of the candidate labels. The score can be included with each label stored in the label data structure 158. For example, the data processing system 102 can determine that a first label defines a cluster from the clusters better than a second label or a third label, and further determine that the second label defines the cluster better than the third label. The data processing system 102 can then use the label generator 134 to assign a score for each of the label, for example, the first label with a score of 5, the second label with a score of 4, and the third label with a score of 3. In another example, the label generator 134 can select a highest scoring label from the candidate labels as the label for each of the token clusters. Continuing from the previous example, the cluster can be assigned the first label with the score of 5. In yet another example, the label generator 134 can determine a score of the second label and the third label for a second cluster. If the label generator 134 determines that the third label has a higher score than the second label, the label generator 134 can select the third label to provide to the second cluster. In some cases, the label generator 134 can assign the labels to each cluster based on other information associated with the tokens or the token clusters. In some other cases, the label generator 134 can assign the labels based on lowest to highest score. The label generator 134 can provide the labeled clusters to a cluster activator 138.

The data processing system 102 can include a cluster activator 138. The cluster activator 138 can be interconnected with various other components of the data processing system 102. The cluster activator 138 can receive clusters from the cluster data structure 156. Each of the clusters can include a label described previously. The cluster activator 138 can activate a subset of the token clusters for real-time content selection via the network 101. The activation can be based on a number of remaining tokens in each of the token clusters. For example, the cluster activator 138 can access the cluster data structure 156 comprising various clusters. The cluster can, for example, be ordered based on a score provided by the label. The cluster activator 138 can determine to activate each of the subset of clusters from highest to lowest scoring labeled cluster. The cluster activator 138 can terminate the activation process based on, for example, reaching a threshold of activate token count. The predetermined number of token count can be 12,000, 13,000, 15,000, or any other values determined by the server 170. Each of the threshold described herein can be configured by at least the cluster activator 138 and stored in the threshold data structure 160.

The cluster activator 138 can determine a number of remaining tokens in a token cluster of the token clusters is less than or equal to a threshold. The threshold can include, for example, 5 tokens, 10 tokens, 15 tokens, etc. In some cases, the cluster activator 138 can disable the token cluster of the token clusters with a number of tokens less than or equal to the threshold to prevent the first token cluster from display via a GUI. The disabling of the clusters can be temporary, such that the cluster activator 138 can activate the disabled clusters to increase the number of tokens to provide each content provider 166. In some other cases, the cluster activator can remove the clusters with tokens less than or equal to the threshold.

The cluster activator 138 can configure the threshold based on a total count of tokens activated using the predetermined threshold. For example, the cluster activator 138 can utilize a threshold of 5 tokens per cluster. The cluster activator 138 can activate each cluster sequentially from a highest to a lowest scoring label, each of the cluster exceeding 5 tokens, for example. The cluster activator 138 can determine that a total number of tokens responsive to adding additional cluster. In this case, the cluster activator 138 can determine that the total tokens exceed a threshold of allowed tokens. The cluster activator 138 can determine to increase the threshold to 10 tokens per cluster. The cluster activator 138 can re-initiate the process by, for example, disabling all the activated clusters, and reactivating the clusters. The cluster activator 138 can activate each of the clusters in various order or sequences, such as bid value, timestamps, geographical information (IP address), or other relevant information determined by the content provider 166.

In some cases, the cluster activator 138 can determine that a number of remaining tokens in a token cluster is greater than or equal to a threshold. For example, the cluster activator 138 can determine that the number of tokens in the remaining clusters exceed 2,000 tokens to provide to each content provider 166. The cluster activator 138 can identify, responsive to determining that the number of tokens exceed the threshold, one or more highest scoring tokens in the token cluster. In this example, the cluster activator 138 can identify 2,000 highest scoring tokens. The cluster activator 138 can determine to activate the 2,000 tokens in combination with the clusters. For example, the cluster activator 138 can activate the token cluster and the highest scoring tokens for display via a GUI subsequent to determining the highest scoring tokens.

The data processing system 102 can include a content selector 144 to select a one or more content items corresponding to various tokens. The content selector 144 can be interconnected with various other components of the data processing system 102. The content selector 144 may analyze, parse, or otherwise process subject matter of candidate content items to determine whether the subject matter of the candidate content items correspond to a web page. The content selector 144 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector 144 may process the metadata to determine whether the subject matter of the candidate content item corresponds to the web page or search query.

In some cases, the content selector 144 can utilize the feedback data stored in a feedback data structure 162 to provide a content item for higher impression rate. The higher impression rate can refer to a content item predicted by a machine learning technique using a model to determine a content item that client devices 174 are more likely to interact with. The content selector 144 can use the feedback data, such as client device 174 information (e.g. mouse hover, page view time, etc.). The content selector 144 can use content publisher device 178 information, such as content items provided or published to one or more websites to display to the client device 174. The content selector 144 can determine not to select a content items previously displayed or published to the client device 174. In some cases, the content selector 144 can access and utilize a feedback data from a first client device 174 to display a content item to a second client device 174 based on the feedback data of the first client device 174.

Content providers 166 may provide additional indicators when setting up a content campaign that includes content items. The content providers 166 (e.g. via the content provider device 166) may provide information at the content campaign or content group level that the content selector 144 may identify by performing a lookup using information about the candidate content item. For example, the candidate content item may include a unique identifier, which may map to a content group, content campaign, or content provider 166. The content selector 144 may determine, based on information stored in data repository 148 about the content provider 166.

The data processing system 102 can include a data repository 148. The data repository 148 can be interconnected with various other components of the data processing system 102. The data repository 148 can include or store at least a token data structure 150, a metric data structure 152, a technique data structure 154, a cluster data structure 156, a label data structure 158, a threshold data structure 160, and a feedback data structure 162. Each data structure of the data repository 148 can be referred to in more details herein and in previous exemplary of FIG. 1. The token data structure 150 can include, store or maintain tokens for granular clusters generation. The tokens can be referred to as keywords, information resource identifiers, device identifiers, or other potential content serving criteria. The tokens can link to content items associated with the content provider device 166. The token data structure 150 can include one or more information associated to the tokens. The information associated to the tokens can include, for example, timestamps, date stamps, IP address associated with each token, definition of the token, character count, or other related token information. For example, the data processing system 102 can receive at least one input token from the client device 174 via the network 101 through the interface 110. The data processing system 102 can further receive information related to the client device and the input token, such as an IP address of the client device 174 and the character count of the input token. The data processing system 102 can associate the information to the input token. The data processing system 102 can store the token received from the client device 174 to the token data structure 150.

The token data structure 150 can store, maintain, or sort the tokens based on the information provided with each token. The token data structure 150 can store sorted tokens based on the timestamps, date stamps, the IP address, or in an alphabetical order. The token data structure 150 can store the sorted tokens, for example, to expedite the process of applying metrics 152 for token evaluation. For example, the data processing system 102 can perform token evaluation using a token evaluator 118. The token evaluator 118 can determine to use a freshness metric to evaluate the token freshness (e.g. newness, recent immerging tokens, etc.). The token data structure 150 can store the rearranged or sorted tokens based on the timestamps or date stamps by determining to use the freshness metric. The token data structure 150 can store the sorted tokens in a forward or reverse order, such as from new to old, old to new, alphabetical "a" to "z", "z" to "a", geographically nearest to farthest, or farthest to nearest. The token data structure 150 can include the geography information of each token based on the IP address received from the client device 174.

The metric data structure 152 can include, store, or maintain various metrics used to generate granular clusters of tokens for content selection. The metrics (or evaluation metrics) can refer to one or more functions to evaluate tokens stored in the token data structure 150. The metrics can be used by at least the token extractor 114 or the token evaluator 118. The metrics stored in the metric data structure 152 can include at least a coherence metric, a granularity metric, a coverage metric, a stability metric, a freshness metric, a readability metric, or other related metrics to evaluate the tokens for granular clustering of tokens. The coherence metric can evaluate the tokens using at least one template on spend weighted sampled segments to determine the coherency of the cluster of tokens. The template can be provided, for example, to the client device 174 responsive to the interface 110 receiving a search query. The spend weighted sampled segments can refer to tokens provided for evaluation. Each token can include a bid value (or weighted by spending) to determine if the tokens in a cluster are coherent to the client device 174 search queries. The granularity metric can evaluate the granularity of each token based on a keyword-cluster (or keyword-segment) ratio. Each cluster (or segment) from the clusters stored in the cluster data structure 156 can include various numbers of tokens. For example, the granularity metric can evaluate a cluster with high number of tokens to be a low granularity cluster and low number of tokens to be a high granularity cluster.

The coverage metric can evaluate tokens based on a revenue covered by the cluster of tokens that is exposable to a content provider 166. The revenue can be defined by, for example, a click-through rate of the tokens or the clusters of tokens, a bid value corresponding to each token, conversion ratio, or other performance elements associated with a content item. The coverage metric can further decide at least one token (e.g. keyword, vocabulary, text, etc.) to provide in a cluster of tokens and check cluster coverage in international languages. The stability metric can evaluate tokens to form at least one cluster based on a stability of each token. The stability metric can further evaluate clusters of tokens to evaluate the stability of each cluster. The stability can be based on at least one portion (e.g. revenue-weighted) of tokens or clusters remained across versions, in terms of visible tokens or clusters. The versions can refer to timestamps, date stamps, platforms, seasons, search engines, or other time or device information.

The freshness metric can evaluate tokens to form at least one cluster based on a freshness (e.g. newness, recent immerging tokens, etc.) of the tokens. The freshness metric can be inversed to the stability metric. The freshness metric can determine the freshness of the tokens based on at least timestamps, date stamps, or time related information of each token. The freshness metric can refer to at least feature freshness or token freshness. The token freshness can be used to capture popular cluster (or segments) to present to the content provider 166. The newly immerged tokens can include, for example, "New_Smartphone_Brand_1", "Smartphone_Brand_2_Version_2019", or other immerged tokens due to new fashion, technologies, or trends.

The readability metric can evaluate tokens to form at least one cluster based on various erroneous tokens included, stored, or maintained in the token data structure 150. The readability metrics can determine, for example, at least one spelling error, at least one language mismatch (or mix of various languages) in cluster, at least one geography mismatch in cluster, at least one token near-duplications in cluster, at least one visible token incoherence, or cluster duplication. The cluster duplication can refer to clusters with similar or the same labels stored in the label data structure 158. In some cases, the data processing system 102 can determine to remove at least one duplicated cluster based on at least the tokens included in each cluster or a label associated to the cluster.

Additionally, the metric data structure 152 can include at least a query hits metric and distance metrics. The query hits metric can be used by a filter 130 to determine at least one token to remove from the cluster based on matches (or non-matched) between a token in a queue (e.g. QStats) to the token cluster. The distance metrics can include multiple metrics such as SKI similarity metric, word embedding similarity metric, word concept embedding similarity metric, or full match Entity/Phil similarity metric. The distance metrics can be used by a cluster generator 122 to group at least two tokens into a cluster. In some cases, the metric data structure 152 can include a weight (or weight value) for each metric. The weight of the metric can be determined by, for example, the token evaluator 118 to perform a first metric before a second metric or perform the first metric without the second metric. In some cases, the weight of each metric can determine the order of which the metrics are applied to the tokens for evaluation. The evaluation can determine the tokens for generating at least one cluster by the cluster generator.

The technique data structure 154 can include, store, or maintain various techniques, such as clustering techniques, de-duplication technique, or filtering techniques for cluster generation, deduplication, or filtering of tokens or clusters. The technique data structure 154 can store the techniques received from, for example, the server 170 in communication with the data processing system 102 via the network 101. The clustering techniques can include at least hierarchical agglomerative clustering ("HAC"), K-means clustering, min-max clustering, and ClustOn. The HAC can utilize at least one metric stored in the metric data structure 152 to perform token clustering based on multiple variations. The HAC variation can include complete linkage, single linkage, or group average linkage to determine at least one similarity between two or more clusters. The K-means clustering can be parallelized to cluster tokens into at least one cluster. The K-means clustering can be used for vector quantization, such as to partition at least one observation into at least one cluster. The min-max clustering can assign a weight to each of the clusters. The highest weighted cluster can be prioritized to provide to at least one content provider 166 and the lowest weighted cluster can be, for example, removed from the cluster data structure 156.

ClustOn can hash data to provide a compromise between the scalability and incremental stability of tokens to provide in a cluster. ClustOn can include multiple phases, such as a first phase (or burn-in phase) and a second phase (or post-burn-in phase). ClustOn can initiate the first phase to collect data received from the data processing system 102. The first phase can collect the data up to a threshold, for example, 200, 400, or 800 data points. The threshold can refer to a predetermined number of data. ClustOn can initiate the second phase responsive to a number of collected data meeting the threshold or termination of the first phase. ClustOn can determine a number of clusters to group the collected data. ClustOn can assign each of the collected data to a respective cluster, based on the difference between a cluster value range and a value of the collected data. For example, cluster A includes a value range of 10-15, cluster B includes a range of 50-54, and cluster C includes a range of 90-96. ClustOn can assign a collected data with a value of 81 to cluster C, based on the difference between the collected data value and the value range of each cluster.

The de-duplication techniques can be performed by a de-duplicator 128 to reduce redundancy and similarity inaccuracies in HAC output by removing at least one token from one or more clusters based on a duplication. The de-duplication techniques can be initiated subsequent to the clustering of tokens. In some cases, the de-duplication techniques can be performed prior to clustering the tokens. The de-duplication techniques can include white space removal, bag of tokens removal, bag of stemmed tokens removal, entity removal, or similar meaning removal. The filtering techniques can be performed by a filter 130 for similar purposes as the de-duplication techniques. The filtering technique can include query hits metric, centroid threshold, or a policy.

The cluster data structure 156 can include, store, or maintain various clusters. The clusters can include a subset of tokens stored in the token data structure 150. The subset of the tokens can refer to a portion, group, or a part of the tokens stored in the token data structure 150. The cluster data structure 156 can store generated clusters by the cluster generator 122. The cluster data structure 156 can further be configured by at least the cluster generator 122 or a post-processor 126. For example, the cluster generator 122 or the post-processor 126 can utilize one or more techniques stored in the technique data structure 154 to remove, maintain, replace, or otherwise configure at least one token or at least one token structure stored in the cluster data structure 156.

The label data structure 158 can include, store, or maintain labels to provide each cluster in the cluster data structure 156. The labels 158 can be generated by a label generator 134. The labels 158 can be further generated based on at least one token from each of the clusters stored in the cluster data structure 156. The label generator 134 can store the generated label in the label data structure 158. The labels can be provided to differentiate between each cluster of the clusters.

The threshold data structure 160 can include, store, or maintain various threshold such as a centroid threshold, a token count threshold, a score threshold, a cluster token count threshold, or a policy threshold. The centroid threshold can refer to a centroid score threshold to determine a similarity between tokens in a cluster. The centroid threshold can be used by a filter 130 to, for example, remove at least one token with a lowest score from a cluster. The centroid score referring to a comparison between two or more tokens based on, for example, definitions of the tokens. The token count threshold can determine the maximum number of tokens to provide to the cluster activator 138. The number can include any range, such as 500, 10,000, 12,000, etc. The cluster token count threshold can refer to a minimum or maximum number of tokens in each cluster of clusters stored in the cluster data structure 156. The minimum and maximum number of tokens can include various ranges, such as 5, 10, 20, 50, etc. The policy threshold (or token policy score) can refer to the threshold for determining if a token is sensitive or having beaker violation.

The feedback data structure 162 can include, store, or maintain one or more feedback data from at least the content provider device 166, the client device 174, or the content publisher device 178. The feedback data can be referred to as performance data, historical data, or other descriptive terms relevant to one or more input by one or more computing devices or output for the devices. The feedback data structure 162 can include, maintain, or store information provided by the content provider device 166, such as token selection, manual token input, content item selection, or other relevant content provider information (e.g. product, address, company, etc.). The feedback data structure 162 can also include, maintain, or store one or more information provided by the client device 174, such as search queries, mouse hover, keypress, or other interaction information provided by the client device. The feedback data structure 162 can further include, maintain, or store one or more information provided by the content publisher device 178, such as content items provided or published to one or more websites to display via at least the content provider device 166 or the client device 174.

Figure 2:
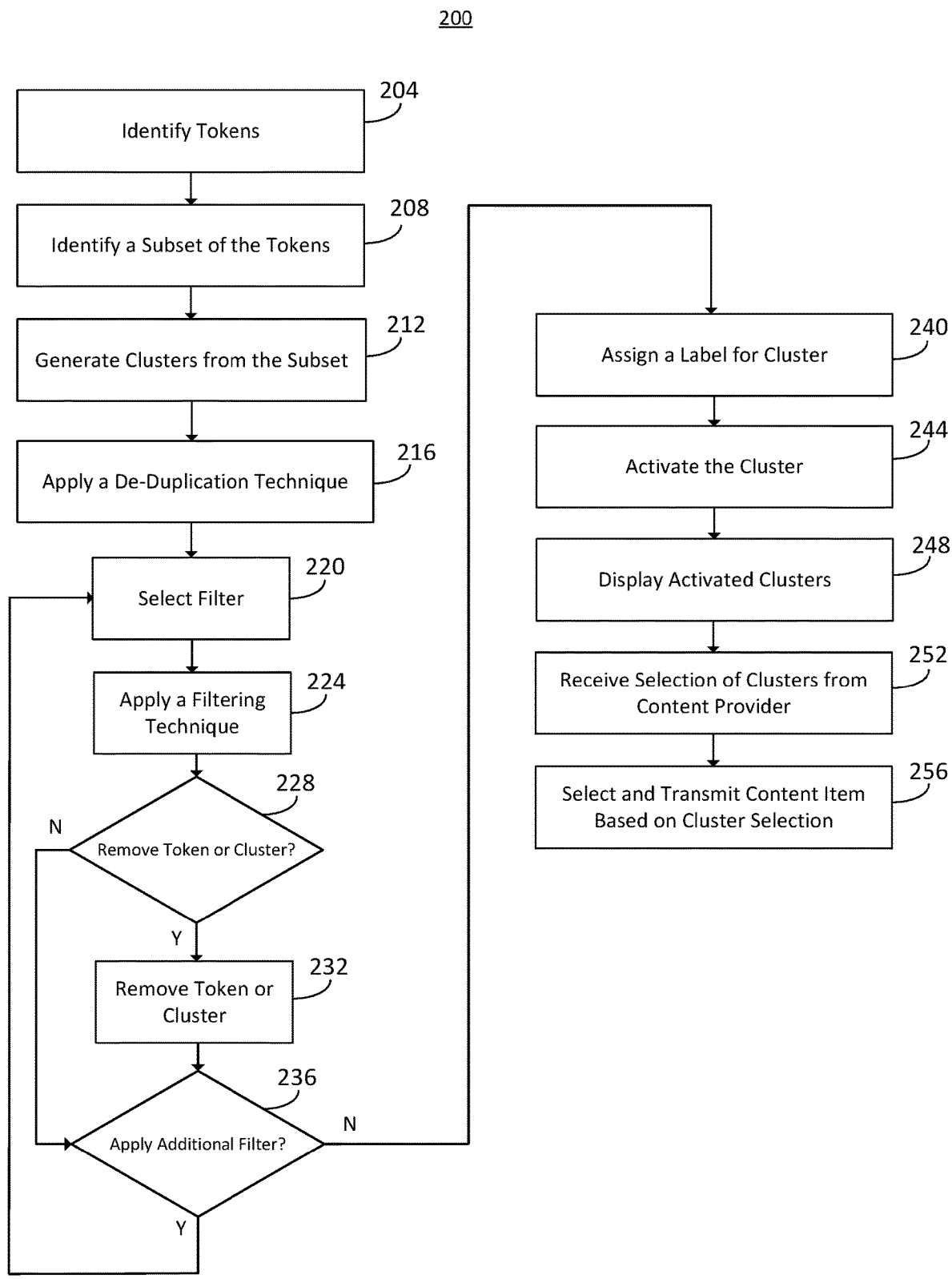
FIG. 2 is a flowchart illustrating a method of granular clusters generation for real-time processing, in accordance with an implementation.

FIG. 2 is a flowchart illustrating a method of generating granular clusters for real-time processing via a computer network, in accordance with an implementation. The method 200 can be performed by one or more system, component or interface illustrated in FIG. 1, FIG. 3A-3B, or FIG. 4, including, e.g., a data processing system, interface, token extractor, token evaluator, cluster generator, post-processor, label generator, cluster activator, content selector, or data repository. In brief overview, the method 200 can include a data processing system identifying tokens based on aggregating input at 204. At 208, the data processing system can identify a subset of the tokens for cluster generation. At 212, the data processing system can generate token clusters from the subset of the tokens. At 216, the data processing system can apply a de-duplication technique to each of the token clusters. At 220, the data processing system can select a filter. At 224, the data processing system can apply a filtering technique to the token clusters to remove tokens erroneously grouped in a token cluster. At 228, the data processing system can determine to remove a token or a cluster. At 232, the data processing system can remove the token or the cluster responsive to the determination to remove the token or the cluster. At 236, the data processing system can determine whether to apply an additional filter. At 240, the data processing system can assign a label to a token cluster. At 244, the data processing system can activate a subset of the token clusters for real-time content selection. At 248, the data processing system can display the activated token clusters. At 252, the data processing system can receive a selection of a cluster from a content provider. At 256, the data processing system can use the cluster to select a content item, and transmit the content item to a client computing device for presentation.

In further detail, the method 200 can include a data processing system identifying tokens based on aggregating input at 204. The data processing system can receive the input from various computing devices over a time interval via a network. The data processing system can communicate with the network to receive the input via an interface. The input can include one or more tokens received from a content provider device, a server, a client device, or a content publisher device. For example, the client device can input a token into a search engine. The search engine can provide the token to the data processing system via a search query. The search engine can include, for example, a program that searches for and identifies items in a database that correspond to keywords or characteristics specified in the search query, including web sites located on the World Wide Web. The client device can input the token via an input device, such as a keyboard, mouse, touchscreen, or other interactive device for generating a token. The content provider device, the client device, and the client computing device can be referred to generally as devices. The devices can refer to a computing device associated to an entity, such as a content provider, a client, or a content publisher. The token can refer to keyword, phrase, script, statement, code, title, vocabulary, text, information resource identifiers, device identifiers, IP address, or other information in a web page.

The data processing system can store the tokens received via the interface in a temporary element, such as a file, folder, or subfolder. The temporary element can refer to an element that can be removed or deleted responsive to an event corresponding to the devices. The event can include at least a shutdown or restart of at least one device, a termination of an application (e.g. website, web browser, document, or other applications) associated to the temporary element, or a timeout (e.g. an interval or time period to remove the temporary element). The timeout can be configured by the data processing system or the devices interconnected with the data processing system via the network. For example, the client device can input one or more tokens into a search engine displayed in a web browser. The data processing system can store the token in a temporary element responsive to receiving the input via a search query. The data processing system can provide one or more content items based on the input token. The client device can determine to terminate the web browser. The data processing system can delete or remove the token from the temporary element subsequent to the termination of the web browser.

The data processing system can store one or more tokens in a static element, such as a folder, or subfolder. The tokens can be received from the interface of the data processing system. The static element can refer to an element that can remain on the devices, the server, or the data processing system. The tokens in the static element can be deleted or removed by an entity (e.g. a content provider, a client device, or a content publisher). The entity can perform a manual action to remove or delete the tokens. The manual action can refer to an action performed via an input device, such as typing, clicking, tapping or other interaction. For example, the client device can identify one or more tokens stored in a static element by navigating through various elements (e.g. folders or files) stored on the client device. The client device can receive one or more actions (e.g. right-click, left-click, etc.), via an interface of the client device, to access a deletion element (or delete button corresponding to files or folders). The client device can receive an indication to interact with the deletion element for deleting or removing the tokens stored in a static element. In some cases, a content provider device, a content publisher device, or the data processing system can access the one or more tokens (e.g. stored in a temporary element or a static element) to generate one or more content items to display via the client device GUI.

The data processing system can receive one or more tokens via the interface. The data processing system can store a first portion of the received tokens in a temporary element. The data processing system can store a second portion of the received tokens in a static element (or permanent element). In some cases, the data processing system can transfer a subset of the tokens from the temporary element to the static element or vice versa. For example, the data processing system can identify (e.g. via a token extractor) a portion or a subset of tokens to transfer from a temporary element to a static element based on timestamps (or date stamps) associated to the tokens. The timestamps can indicate a last modified time for a token. The data processing system can identify that at least one token stored in the static element has not been modified or configured for a time interval, such as a day, a month, a year, etc. The identified token can be transferred from a static element to a temporary element for automatic removal based on a countdown. The countdown can range from, for example, a day, a week, a month, or a year.

At 208, the data processing system can identify a subset of tokens for cluster generation. The tokens can be received via an interface and extracted by a token extractor. The tokens can be stored in a token data structure maintained in a data repository of the data processing system. The data processing system can include various information associated with the tokens, such as scores, timestamps, date stamps, IP address, or language information. The data processing system can provide access to the token data structure for various interconnected components, such as an interface, a token extractor, a token evaluator, or a post-processor.

The data processing system can identify the subset using a token evaluator. The subset can refer to a group, a portion, or a fraction of the tokens stored in the token data structure. The data processing system can evaluate (e.g. via token evaluator) the tokens using various metrics stored in the metric data structure. The metrics can include coherence metric, a granularity metric, a coverage metric, a stability metric, a freshness metric, a readability metric, distance metrics, or other related metrics to evaluate the tokens for granular clustering of tokens. The data processing system can maintain, remove, or replace the evaluated tokens. For example, the data processing system can identify that a token is a seasonal token. The seasonal token can refer to tokens that appears in a search query in a time interval. An example of seasonal token can include "Christmas Tree", which can be provided as a search query on October, November, or December. The data processing system can remove the identified seasonal token based on at least one metric.

The data processing system can apply a weight to metrics stored in the metric data structure. The weight can refer to a value, a significance, or importance of a metric. The data processing system can apply the weight based on, for example, a request from a content provider device, a client device, or a content publisher device. The weight can include a range of values, such as 1 to 5, 1 to 10, or any range thereof. The data processing system can determine an order or sequence to apply metrics to tokens based on the weight of each metric. For example, a weight of 5 can be applied to a coherence metric, and a weight of 3 can be applied to a granularity metric, such that the coherence metric has a higher impact than the granularity metric when evaluating the tokens. The data processing system can determine to evaluate tokens based on the coherence metric, and subsequently evaluate the tokens based on the granularity metric. The data processing system can generate a subset of tokens responsive to evaluating the tokens based on the weight applied to the metrics.

The data processing system can determine to not perform at least one metric based on not meeting a threshold. The threshold can refer to a minimum required score for a metric to be used for token evaluation. The threshold can be stored in a threshold data structure maintained in the data repository. For example, the data processing system can include a threshold of 4. Referring back to the coherence metric with the weight of 5 and the granularity metric with the weight of 3, the data processing system can evaluate tokens based on the coherence metric without the granularity metric. The metrics can be referred to in further details in FIG. 1.

At 212, the data processing system can generate token clusters from a subset of tokens. The subset of the tokens can be determined at 208 via a token extractor. The token clusters can include two or more tokens from the subset of the tokens in each token cluster. The cluster can refer to a group, a bundle, a pair, or a category of tokens. The data processing system can generate the token clusters via a cluster generator. The cluster generator can be interconnected with various components of the data processing system. For example, the data processing system can cluster (e.g. via cluster generator) two or more tokens responsive to evaluating the tokens with at least one metric. The data processing system can store clusters of tokens in a cluster data structure maintained in a data repository.

The data processing system can generate clusters of tokens via various techniques obtained from a technique data structure. The techniques can include hierarchical agglomerative clustering ("HAC"), K-means clustering, min-max clustering, or ClustOn. The techniques can be referred to in more details and exemplary in FIG. 1. The data processing system can generate the clusters via a combination of techniques in a sequential. For example, the data processing system can generate a cluster using HAC and K-means clustering, K-means clustering and HAC, min-max clustering and HAC, or any combination thereof in the respective order. The HAC can include at least one of complete linkage, single linkage, or group average linkage. In some cases, the data processing system can assign a weight to each technique. The data processing system can cluster tokens based weighted techniques. The clustering based on weighted techniques can be similar to identifying a subset of tokens based on weights of the metrics, as seen at 208.

The data processing system can generate clusters of tokens based on one or more techniques in combination with one or more metrics. A metric for clustering token can include distance metrics, such as SKI similarity metric, word embedding similarity metric, word concept embedding similarity metric, or full match Entity/Phil similarity metric. The distance metrics can be stored in a metric data structure. For example, the data processing system can identify (e.g. via token extractor) a subset of tokens from the token data structure for cluster generation. The data processing system can utilize a technique (e.g. via a cluster generator) to accumulate two or more tokens to generate a cluster. The data processing system can repeat the accumulation to generate various clusters. Responsive to generating the clusters, the data processing system can utilize at least one of various distance metrics to remove, rearrange, or otherwise configure the tokens in the clusters. The process of removing, rearranging, or configuring can refer to transferring at least one token from a first cluster to a second cluster, removing a token from a cluster, merging two or more clusters, or any configuration or modification of the tokens or clusters.

At 216, the data processing system can apply one or more de-duplication techniques to each of the token clusters (e.g. clusters). The clusters can be stored in a cluster data structure. The de-duplication techniques can be stored in a technique data structure. The data processing system can generate the clusters to store in the cluster data structure at 212. The data processing system can apply a de-duplication technique via a de-duplicator of a post-processor. The data processing system can apply (e.g. via the de-duplicator) the de-duplication techniques to configure, maintain, or remove one or more tokens from a cluster. The de-duplication techniques can include white space removal, bag of tokens removal, bag of stemmed tokens removal, entity removal, or similar meaning removal. The de-duplication techniques can be referred to in more details in FIG. 1.

The data processing system can apply two or more de-duplication techniques in an order or concurrently. The order can refer to a sequence of techniques applications, which can be based on a weight of each technique, as referred to at 214. The concurrent application of de-duplication techniques can refer to applying the techniques simultaneously or synchronously via, for example, multi-threading, or other parallel processing means. For example, the data processing system can select a first technique and a second technique to apply de-duplication on a cluster. The data processing system can select the techniques subsequent to a generation of one or more clusters via the cluster generator. The first technique can include a weight of 4 and the second technique can include a weight of 3. The data processing system can (e.g. via a de-duplicator) to apply a first technique and subsequently the second technique to the cluster based on the weights of each technique.

The data processing system can apply a de-duplication technique to remove at least one token from a cluster. The removed token can be transferred to a token data structure or deleted from the data repository. For example, the data processing system can apply a similar meaning removal technique to remove tokens with similar meanings another token within a cluster. In another example, the data processing system can apply a bag of tokens removal to remove reordered or repeated set of tokens, such as "cars cars used" and "used cars". In this example, the data processing system can remove the "cars cars used" set of tokens and maintain the "used cars" set of tokens.

The data processing system can apply a de-duplication technique to configure a set of tokens in a cluster. The data processing system can configure the set of tokens by, for example, removing or replacing a portion (or character) of the token. For example, the data processing system can apply a white space removal to identify a set of tokens with multiple white spaces. In this example, the set of tokens can be "used cars". The data processing system can determine to remove a white space from the token, such as to configure the set of tokens to maintain the cluster data structure. The data processing system can modify the "used cars" to "used cars" set of tokens.

At 220, the data processing system can select a filter from filters stored in a metric data structure, a technique data structure, or a threshold data structure. The various filters can refer to filter techniques applied by a filter of a post-processor. The data processing system can select a filter technique based on weights associated with the filter technique, similar to weights of the metrics and other techniques maintained in the metric data structure or the technique data structure. The weight can refer to a score, value, significance, impact, or importance of the filter technique. The data processing system can select a filter responsive to, for example, a generation of a cluster by a cluster generator or applying a de-duplication technique. The data processing system can select the filtering technique to apply via the filter of the post-processor at 224. The data processing system can select the filtering technique sequentially from a list of filters. In some cases, the filter selection can be initiated prior to an execution of the de-duplication technique. For example, the method and decision block 220, 224, 228, 232, 236 can occur prior to block 216, such that applying a de-duplication technique subsequently proceed to block 240.

The data processing system can select a filter to remove one or more tokens from a cluster based on a policy stored in a threshold data structure. The policy can include, for example, a minimum or a maximum value or score to select a filter for filtering tokens. The data processing system can identify a number of tokens stored in a cluster exceed a value threshold. For example, the data processing system can identify a value threshold of 10, representing a maximum tokens per cluster. The data processing system can identify a cluster with greater than 10 tokens, such as 12, 15, 20, etc. The data processing system can select a filtering technique to determine whether to remove one or more tokens to meet the value threshold. The data processing system can identify a score of a token in a cluster exceed a score threshold. For example, the data processing system can identify a score threshold of 4, representing a minimum score for each token in a cluster. The data processing system can identify a cluster with at least one token with a various score, such as 3, 3.9, 4.2, 5, etc. The data processing system can select a filtering technique to determine whether to remove the token with a score lower than the score threshold, such as the token with a score of 3 or 3.9.

The data processing system can select a filter to remove one or more clusters from a cluster data structure based on a policy stored in a threshold data structure. The policy can include a minimum or a maximum value or score. The value can refer to a minimum number of tokens per cluster. The score can refer to a minimum average score for the tokens in a cluster. The data processing system can identify a cluster with a number of tokens less than a threshold. For example, the data processing system can identify a value threshold of 5. The data processing system can identify a cluster with less than 5 tokens stored in a cluster data structure. The data processing system can select a filtering technique to determine whether to remove the identified cluster. The data processing system can identify an average score of tokens in a cluster exceed a score threshold. For example, the data processing system can identify a score threshold of 4. The data processing system can select a cluster and perform an averaging technique to determine an average score of the tokens of the cluster. The averaging technique can refer to a method of summing the scores and dividing by the total number of tokens, or other types of calculation methods for averaging numerical values. The data processing system can identify an average score of a cluster is less than the score threshold. The data processing system can select a filtering technique to determine whether to remove the cluster from the cluster data structure.

At 224, the data processing system can apply a filtering technique to the token clusters to remove tokens erroneously grouped in a token cluster of token clusters. The data processing system can apply the filtering technique by a filter of a post-processor. The data processing system can apply the filtering technique similar to a de-duplication technique application. The data processing system can apply the filtering technique subsequent or responsive to selecting a filter at 220, for example.

The data processing system can include various filtering techniques, such as query hits (or query hits metric), centroid (or centroid threshold), or policy. The query hits metric can be stored in the metric data structure. The centroid threshold and the policy can be stored in the threshold data structure. The post-processor including de-duplicator and a filter can access at various data structures within a data repository to maintain, replace, configure, remove, or otherwise manage tokens in clusters. The data processing system can apply the filtering technique to determine whether to remove a token or a cluster at 228 based on an output of the token or the cluster.

The data processing system can determine to perform a filtering technique based a score (or a centroid score) associated with the tokens. The score can include a range similar to a weight, such as 1 to 5, 1 to 10, etc. The data processing system can determine a centroid score based on a comparison between two or more tokens for similarity in the tokens. The similarity can refer to similar definition or structure (or set of tokens) within a cluster. The data processing system can determine a centroid score for a token based on a feedback data stored in the feedback data structure. The feedback data can include, for example, search query, query hits, or other information to determine a token with higher interaction by a client device. For example, the data processing system can determine a score of 3 for a first token and a score of 2.5 for a second token. The data processing system can identify a threshold centroid score of 2.8. The data processing system can select or mark (e.g. via a filter) the second token with the score lower than the threshold centroid score to determine whether to remove the second token.

The data processing system can select a centroid filter (or centroid threshold) to identify one or more tokens in a cluster for removal. The centroid filter can determine whether to remove a token based on a similarity between the token in the cluster and other tokens in the cluster. The data processing system can assess the similarity (e.g. definition or structure) between each token in a cluster and assign a score (or centroid score) to each token in the cluster. The centroid score can be a temporary score assigned to the tokens by, for example, the post-processor. The post-processor can remove the score responsive to the execution of the centroid filter. For example, the data processing system can identify a centroid score threshold of 3. The data processing system can apply a centroid filter to identify a similarity between tokens in a cluster. The data processing system can score each token based on the similarity between each token and a feedback data indicating, for example, historical token searched by client devices. The data processing system can select or mark at least one token with the centroid score of less than 3 (e.g. high similarity with low historical search in comparison to other tokens) for removal.

The data processing system can select a policy filtering technique to remove one or more cluster from the cluster data structure. The policy can refer to a sensitivity threshold for a token to be considered as sensitive or having beaker violation. The sensitive or beaker violation can refer to tokens associated to content item with restriction, such as profanity, age restricted content, or other inappropriate content items. The data processing system can score each token in a cluster based on a sensitivity level. The scores in the cluster can be averaged and compare with the sensitivity threshold for removal. For example, the data processing system can identify a sensitivity threshold of 3.5. The data processing system can select a cluster and apply a policy filtering technique. The data processing system can average or identify the sensitivity scores for tokens in the cluster to be 3.8 (e.g. greater than or equal to the sensitivity threshold). The data processing system can select or mark the cluster for removal.

At 228, the data processing system can determine to remove a token or a cluster. The data processing system can determine to remove the token or cluster based on at least one filtering technique. The data processing system can remove the token or the cluster at 232 based on the selected filtering technique. The one case, the data processing system can determine to remove a token or a cluster responsive to identifying the token or the cluster selected or marked for deletion. In a first example, the data processing system can select a query hits metric as a filtering technique. The data processing system can determine to remove a token or a cluster if a token is query hits from a status of a queue do not match other tokens in the cluster. The query hits from the status of a queue can refer to a match (or non-match) between tokens in a queue to tokens in the token cluster. This can include tokens with different language or tokens received from different geographical region (or country).

In a second example, the data processing system can select a centroid filtering technique. The data processing system, based on the centroid filtering technique, can remove one or more tokens from a cluster if a score (or centroid score) of a token is below a threshold. The data processing system can determine the score of each token based on the similarity of the tokens and/or query hit count for each token. The query hit count can include a number of times a client device input the token. For example, the token "car" can be provided 100 times in search queries by client devices and the token "cars" can be provided 50 times in the search queries. The data processing system can determine a first score for the token "car" to be higher than a second score for the token "cars", such as 4 for the first score and 3 for the second score. Further in the second example, the centroid threshold can be a score of 3.5, such that the data processing system removes the token "cars" instead of the token "car".

In a third example, the data processing system can select a policy as a filtering technique. The policy can be stored in a threshold data structure, or in some cases, a feedback data structure. The policy can be predetermined by a content provider, a client device, a content publisher, a server, or various information provided by other entity. The data processing system can remove an inappropriate or sensitive token from the cluster based on the policy. The inappropriate or sensitive token can refer to vocabulary or languages with, for example, age restriction, profanity, or other related offensive remarks determined by the entities.

The data processing system can determine not to remove a token based on a conflict with a policy (or threshold) stored in a threshold data structure. The policy can include a minimum token number or bid value. The data processing system can determine not to remove a token if the token has a bid value or if removing the token reduces the total number of tokens to be less than the minimum token number in a cluster. For example, the data processing system can mark or select 3 tokens to remove from a cluster of 12 tokens. The data processing system can identify a minimum token number policy of 10. The data processing system can determine to remove 2 of the 3 tokens marked or selected for removal. In reference to the previous example, the data processing system can identify a bid value policy for maintaining or removing tokens. The data processing system can identify the 3 tokens as having a bid value of 0, 10, and 20. In this case, the data processing system can remove the token with the bid value of 0 and maintain the tow tokens in the cluster.

The data processing system can determine not to remove a cluster based on a conflict with a policy, similar to determining not to remove a token. The policy can include a minimum cluster number or bid value. The data processing system can determine not to remove a cluster if the cluster has a bid value or if removing the cluster reduces the total cluster count to less than the minimum cluster number. For example, the data processing system can identify a minimum cluster number of 50. The data processing system can include 20 marked or selected clusters out of 60 clusters for removal. The data processing system can select 10 out of the 20 marked clusters to remove to maintain 50 clusters for providing to a content provider device. In another example, the data processing system can identify a bid value to maintain or remove clusters. The data processing system can identify 14 of the 20 marked clusters include a bid. In this case, the data processing system can remove 6 of the marked clusters without the bid and maintain the 14 marked clusters to satisfy the policy.

The data processing system can determine not to remove a token or cluster based on the selected and applied filtering technique. For example, the data processing system can select the policy technique to remove a sensitive token or cluster of tokens. The data processing system may not identify a token or a cluster of tokens that are sensitive for removal. In this case, the data processing system can proceed to determine to apply additional filter at 236.

At 232, the data processing system can remove the token or the cluster responsive to the determination to remove the token or the cluster. The data processing system can remove the token based on a filter technique selected at 228. The data processing system can remove the token by deleting the token from a cluster or transferring the token from the cluster to the token data structure. For example, the data processing system can delete a token from the cluster by freeing the token from the data repository. In another example, the data processing system can transfer the token from a first cluster to a second cluster, as to remove the token from the cluster.

The data processing system can remove the cluster by, for example, deleting all tokens within the cluster, deleting a pointer to the cluster and freeing the cluster, or merging the cluster to a different cluster. For example, the data processing system can delete tokens in a cluster full the cluster to mark the cluster with a null flag (or marker). The data processing system can remove the cluster responsive to identifying the null flag. In another example, the data processing system can merge the cluster by transferring the tokens of the cluster to at least one other cluster. The transferring of tokens from a first cluster to a second cluster can remove the first cluster and increase a token count of the second cluster.

At 236, the data processing system can determine to apply an additional filter (or filtering technique). The data processing system can determine to apply an additional filter if there are additional available filters that have not yet been applied to the data set. The data processing system can determine to include an additional filtering technique based on a determination to remove a token or a cluster at 228 or the removal of the token or the cluster at 232. The removal of the token or the cluster can refer to an execution of a filter of a post-processor via a first filtering technique. The additional filtering technique can refer to a second filtering technique. For example, the data processing system determine not to remove a token or cluster based on a first filtering technique at 228 to responsively determine to apply additional filtering technique. In further example, the data processing system can determine to apply a second filtering technique responsive to the execution of the first filtering technique.

If the data processing system determines, at 236, to apply an additional filter, the data processing system can return to 220 to select a second filter, the data processing system can determine to apply an additional filter by selecting a second filtering technique at 220. The data processing system can determine to apply the additional filter based on, for example, a number of tokens in a cluster exceeding a threshold. For example, the data processing system can identify a threshold of 10 tokens per cluster. The threshold stored in a threshold data structure. The data processing system can identify that a cluster contains more than 10 tokens. In response to identifying the number of tokens, the data processing system can determine to select additional filter at 220 to reduce the number of tokens in a cluster. In some cases, the data processing system can determine not to apply an additional filtering technique, such as to assign a label for the cluster at 240.

At 240, the data processing system can assign a label to each of the token clusters. The data processing system can assign the label based on determining not to apply additional filter at step 236. The data processing system can utilize a label generator to generate or apply a label to each cluster of various generated clusters. The data processing system can store generated labels in a label data structure maintained in the data repository. The label can be referred to as, and use interchangeably with other descriptive terms, such as tag, category, name, or identity. The data processing system can refer to the label to differentiate between each cluster stored in a cluster data structure.

The data processing system can generate a label for a cluster based on a theme of each cluster. The theme can refer to a common token of a token set, a common definition between tokens, or other similarities associated with the tokens of the cluster. For example, a cluster can include "fun park", "theme park", "ferry wheel", or other flat rides. In this example, the data processing system can generate an "amusement park" label to categorize the mentioned tokens. The label can be stored as part of the cluster, which can refer to a topic, a subject, or a theme of the cluster.

The data processing system can assign a token as a label to a cluster. The token can be from one of the tokens stored in the cluster. For example, the data processing system can identify a cluster with "Car_Make_1 Model_1", "Car_Make_1_Model_2", "Car_Make_1_Model_1.5", and "Car_Make_1_Model_3" as the tokens. The data processing system can generate, duplicate, or otherwise match a label to the token "Car_Make_1". The data processing system can assign the label "Car_Make_1" to the cluster of this example. The generation of the label can be responsive to a post-processor task, such as applying a de-duplication technique at 216 or a filtering technique at 220, 224, 228, 232, or 236.

The data processing system can assign a label to a cluster responsive to identifying candidate labels stored in the label data structure. The candidate labels can refer to pre-existing labels. The data processing system can select an equivalent or a greater number of candidate labels to assign each cluster. The data processing system can apply a score to each label responsive to assigning the label to a cluster of various clusters. The score can be stored in a label data structure 158 with each label. The score can refer to a value (or bid value) to determine a relevancy of a cluster to the content provider. The relevancy of the cluster can refer to a similarity between a token provided by a content provider device and tokens included in a cluster. For example, the data processing system can identify various input tokens from client devices. The data processing system can match or relate the input tokens to a label of a cluster or token stored in the cluster. The data processing system can increase a hit count associated with the token and/or concurrently increase a score of the label based on the match. The score can be a range, for example, from 1 to 5, 1 to 10, or any combination thereof. In another example, the score can be included with each candidate label prior to assigning the label to each cluster. In this case, data processing system can select a highest scoring label from the candidate labels as the label for each of the clusters. The highest scoring label can refer to a label with a score greater than other unassigned labels. The data processing system can assign the highest scoring label to each cluster based on at least a size of the cluster, an average score of the tokens in a cluster, or other information related to the tokens in the cluster.

At 244, the data processing system can activate a subset of the token clusters for real-time content selection. The subset of clusters can refer to a portion of the clusters stored in the cluster data structure. The data processing system can activate the subset of the clusters responsive to assigning the labels to the clusters at 240. The activation of the subset can refer to selecting a cluster or a label of the cluster to be visible to a content provider via a content provider device. The cluster or the label of the cluster can be visible via a GUI of the content provider device.

The data processing system can select a subset of clusters for activation based on a score of the labels. The score of the labels can be referred to at least at 240 and in more details in FIG. 1. For example, the data processing system can determine to select a subset of clusters to display based on a ranking from highest to lowest scoring clusters. The highest to lowest score can refer to a score from, for example, 10 to 1, 5 to 1, or other range in the respective order. The data processing system can limit the clusters to, for example, 20 clusters, 40 clusters, or 100 clusters to provide to a content provider. In some cases, the content provider can request additional clusters, for example, via a drop-down icon, a scroll action, or a refresh action. The data processing system can activate additional clusters responsive to the request from the content provider device. In some other cases, the data processing system can activate all available clusters within the cluster data structure to the content provider device. The activated clusters can be displayed in a list format, which can be stored based on, for example, scores of the clusters, an alphabetical order, timestamps, geographical location, languages, or other token related information.

The data processing system can determine that a number of remaining tokens in a cluster of the clusters is greater than or equal to a threshold. The threshold can be stored in a threshold data structure. The threshold can refer to a maximum number of tokens to display on a content provider device. The data processing system can disable the cluster of the clusters to prevent the cluster from displaying via a GUI of the content provider device. For example, the data processing system can activate a first cluster and a second cluster to display via a content provider device. The data processing system can identify a threshold of 50, which refers to a maximum number of tokens to display on the GUI. The first cluster can include 45 tokens and the second cluster 20 tokens. The data processing system can activate the first cluster including the 45 tokens to the content provider device and disable the second cluster to prevent the GUI from displaying the cluster. The disabling of the cluster can refer to hiding the cluster or minimizing the tokens to only display a label of the cluster. The data processing system can activate the disabled cluster responsive to a request by the content publisher device to view or access the tokens in the disabled cluster.

The data processing system can determine a number of remaining tokens in a cluster of clusters is greater than or equal to a threshold. The threshold can be similar to the previous threshold, which can refer to a total activated tokens or clusters. In this case, the data processing system can identify highest scoring tokens in the cluster. The data processing system can activate the cluster (or a label of the cluster) and the highest scoring tokens to provide the content provider device to display via a GUI at 248. For example, the data processing system can identify a threshold of 50 tokens. The data processing system can determine that a cluster includes 100 tokens. The data processing system can identify and compare scores of each token to other tokens in the cluster. The scores can be stored with the token in the token data structure. The data processing system can select and activate the cluster and 50 highest scoring tokens of the cluster to display via the content provider device at 248.

At 248, the data processing system can display the activated token clusters. The data processing system can utilize the interface to display the activated clusters via a GUI of the interface. The data processing system can transmit the activated clusters to a content provider device to display via a GUI of the content provider device. For example, the data processing system can activate one or more clusters based on a threshold or score of the cluster, as seen at 244. The data processing system can transmit the clusters to the content provider device via a network in communication with the interface of the data processing system and the content provider device. The content provider can receive the clusters, for example, on a website within a web browser. The data processing system can display the cluster to the content provider in various tabs (or icons), such that each tab represents a cluster. The content provider can interact with a tab (e.g. via a click) to, for example, display tokens maintained in the cluster associated to the tab. The data processing system can display the token as a dropdown list, or other expansion extension listing. In some cases, the data processing system can provide the clusters in a list format, such that the content provider can, for example, scroll down the web page to view the clusters or tokens for cluster selection at 252.

At 252, the data processing system can receive a selection of clusters from a content provider. The selection can refer to a click, interaction, confirmation, or other action executed by the content provider to select one or more cluster from provided clusters. The cluster selection can include various tokens corresponding to various content items. The data processing system can receive the selection via an interface from a network. The selection can be stored in a feedback data structure maintained in the data repository. The data processing system can trigger or initiate a content selector based on the selected clusters at 256. In some cases, the data processing system can receive a selection of tokens of clusters. For example, a content provider can expand a cluster with label "car" to view various tokens relevant to the label. The tokens can include, for example, "Car_Make_1", "Car_Make_2", "Car_Make_3", or other car manufacturer. In this example, the content provider can choose each car manufacturer individually. The data processing system can receive the request for the car manufacturer and select at least one content item (e.g. via a content selector) based on the request. In some cases, the content provider can select the label of the cluster the token for the data processing system to select a content item.

At 256, the data processing system can select a content item to transmit based on the cluster selection. The content item can refer to at least a banner, a link, an image or other items associated to a content provider. The data processing system can store the content item in a data repository or transmit the content item to be stored in a server central data repository. The content provider can generate one or more content items to provide a client device with the content item via the content selector. The data processing system can provide the content item to the client device based on a request, such as inputting a token or a set of tokens into a search engine. The input token can be sent to the data processing system to process the input token as a request for a content item. The input token can refer to a subject matter, which can be associated to a content item corresponding to a webpage. For example, the data processing system can receive a request for a content item from a client device via a search query. The data processing system can process the search query (e.g. a token or a set of tokens received from the client device) to identify a subject matter related to the request. The subject matter can refer to a definition, a meaning, or an intention information of a client device. The data processing system can then select (e.g. via a content selector) one or more content items stored in a memory (e.g. data repository) to provide the client device for display via a GUI. The data processing system can determine the content items based on a comparison between the request and labels of clusters or tokens within the clusters. The data processing system can provide the content item based on, for example, a definition or term match comparison. In some cases, the data processing system can provide the content item based on a bid value associated to each content item. The bid value can refer to a bid between content providers via a bidding system. In this case, the data processing system can provide the content item based on a highest to lowest bid value. The highest to lowest referring a sequence of ordering the content item based on a decrement in bid values.

The data processing system can identify a client device information responsive to providing a content item. The client device information can include mouse hover, clicks, IP address, timestamps, duration of page view, content item interaction (e.g. view, click, or hover), or other information received from the client device. The data processing system can store the client device information in a feedback data structure to select a second content item to provide a client device responsive to a second request from the client device. For example, the data processing system can store client device information based on providing first content items to a client device responsive to a first client device request. The data processing system can receive a second client device request to a second content item via one or more client device instruction, such as page refresh, additional search query, or initiating a redirect link (e.g. clicks on links). The data processing system can select (e.g. via content selector) second content items based on the client device information associated with the first content item provided to the client device. The second content items may not include content items from the first content items. In this case, the data processing system can provide non-duplicate content items with each search query or refresh.

Figure 3A:
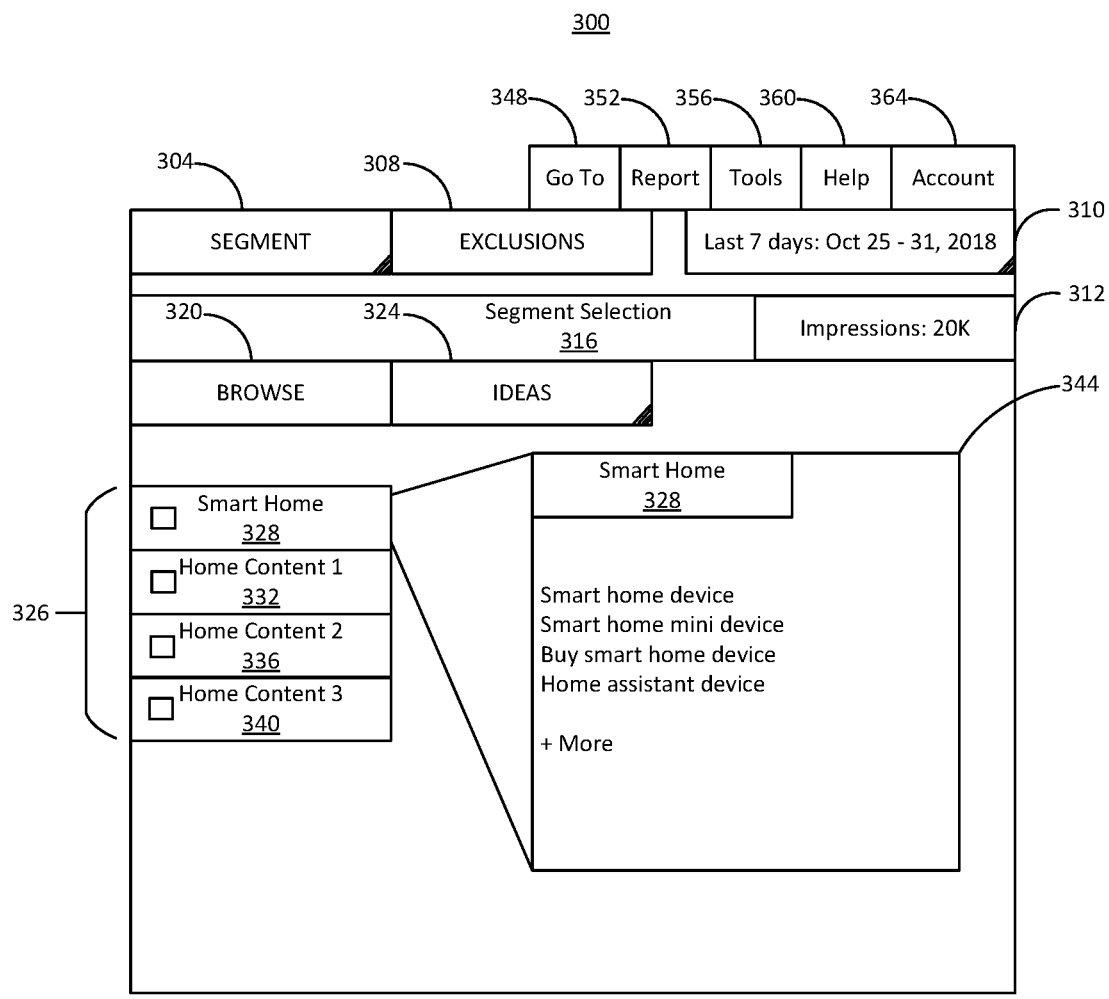
FIG. 3A-3B illustrate a user interface (UI) for presenting custom cluster selection to content providers, in accordance with some implementations.
Figure 3B:
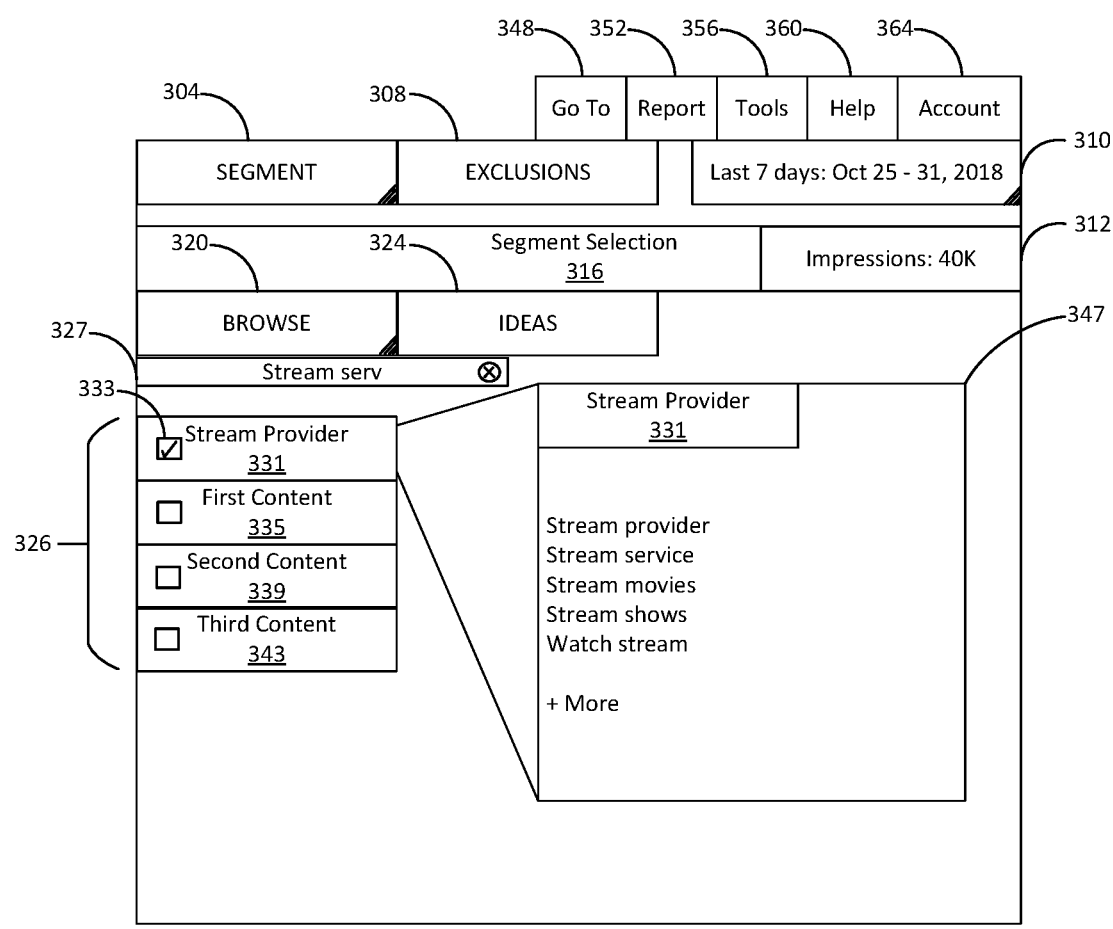

Referring generally to FIG. 3A-3B, a user interface (UI) for presenting custom cluster selection to content providers can be shown in accordance with an implementation. The UI 300 can be performed by one or more system, component or method illustrated in FIG. 1, FIG. 2, or FIG. 4 including, e.g., a data processing system, interface, token extractor, token evaluator, cluster generator, post-processor, label generator, cluster activator, content selector, or data repository. The UI 300 can include various tabs, icons, text, images, colors, or other navigation information for accessibilities. For example, a content provider 166 can access a site via a network 101 to segment (or cluster) selection. The segment selection can refer to a group of client devices to, for example, provide content items. The UI 300 can include at least a segment tab 304, exclusions tab 308, impression range 310, impression count 312, segment selection window 316, browse tab 320, ideas tab 324, segment list 326, go to tab 348, report tab 352, tools tab 356, help tab 360, or account tab 364. Responsive to an interaction (e.g. click, hover, drag, etc.) with a tab, a window, or a list, the UI 300 can generate, display, or provide an indication of the interaction. The indication can include an animation (e.g. bloom, gloss, blink, flash, or other effect) or color configuration (e.g. gray to blue, red to green, or other color changes to illustrate the interaction).

The UI 300 can include a segment list 326 with various segments selection options. The UI 300 can provide a segment selection range, such as 2, 4, 6, or other ranges to display the segment selection option. The segment list 326 can be expanded to a first segment 328, a second segment 332, a third segment 336, or and a fourth segment 340, for example. The UI 300 can determine to provide a pop-up box 344 or other expansion features to display further details of the segment. The UI 300 can determine to provide the pop-up box 344 based on an interaction by a content provider device 166, such as a mouse hover or mouse click. The UI 300 can display a list of tokens (or keywords) included in the segment 326.

The UI 300 can include an impression count 312 based on a segment of the segment list 326 selected or interacted by a content provider 166. The impression count 312 can be based on a historical impression. In some cases, the impression count 312 can be based on a predicted impression of the segment based on the historical impression. The historical impression can select via an impression range 310. The UI 300 can display the impression range 310 as a drop-down menu, a back and forth selection (e.g. via mouse click or scroll), or other interaction features for selecting an option in a computing device. The impression range 310 can include a day, month, year, time range (e.g. a first to a second date), season, or other range to accumulate a historical impression data. The impression data can be store in a feedback data structure 162 within a data repository 148 of the data processing system 102. The impression range 310 can indicate to the content provider 166 a successful level of the segment selected by the content provider 166. The UI 300 can responsively display the impression count 312 based on the selected impression range 310 or the selected segment from the list of segments 326. The UI 300 can update the impression count responsive to additional segment selection or a configuration in impression range 310. Similarly, the impression count 312 can update responsive to configuring the impression range 310 or receiving new feedback data.

The UI 300 can include a go to tab 348, a report tab 352, a tools tab 356, a help tab 360, or an account tab 364, which can be referred to generally as site tabs. The content provider 166 can interact with the site tabs to initiate a pop-up window, switch window, or otherwise display other windows and functions corresponding to an interacted or selected site tab. In a first example, a content provider 166 can interact with the go to tab 348 to initiate a pop-up search box (not shown). The content provider 166 can type a token or a set of tokens to navigate to additional content within the website the UI 300 is displayed in. In some cases, the content provider 166 can search utilize the go to tab 348 to input a search query, for example, to search for a question or element. The question or element can be associated to the UI 300.

The UI 300 can display reports based on an interaction to the report tab 352 by the content provider 166. The content provider 166 can interact with the report tab 352 to view a detailed or summarized report (not shown) associated to the content provider. The UI 300 can display the report via an additional tab, a pop-up dialog box, or in some cases, an external document downloaded from the site. The report can include graphs, images, or texts, indicating a historical performance data and a predicted performance data corresponding to the content provider 166. For example, the content provider 166 can click on the report tab 352 to open a pop-up dialog box. The UI 300 can display a historical data (or impressions associated to selected segments of the content provider 166) over a time interval in a line graph. The UI 300 can display a summary text to provide news, events, or updates associated to the selected segments or a content provider 166 website or content item. In some cases, the UI 300 can display a predicted impression based on the segments selected by the content provider 166. Additionally, the UI 300 can display a historical or predicted data of segments not selected by the content provider 166. The UI 300 can display the predicted data with a mark or an indication. For example, the data processing system 102 can provide a discolored portion of a line in a line graph to indicate a prediction starting at a change of color in the line. The line graph can be a 2-D graph indicating, for example, a timestamp in an x-axis and an impression count 312 in a y-axis of the graph.

The UI 300 can display various tools (or website tools) based on an interaction to the tools tab 356 by the content provider 166. The UI 300 can display the tools (not shown) via a pop-up dialog box or an additional tab for tool selection. The tools can include UI 300 settings or customization. For example, the content provider 166 can select the tools tab 356 to initiate a setting window. The setting window can provide a customization options to the UI 300 for the content provider device 166. The content provider 166 can determine to configure the UI 300 settings, such as color setting, layout structure adjustment (e.g. tab position or position), font setting, or other configuration setting.

The UI 300 can display help options (or help window) based on an interaction to the help tab 360 by the content provider 166. The UI 300 can display the help options similarly to displaying the various tools. The help options can include frequently asked questions ("FAQ"), a search box, website administrator contact information, or other information to provide feedback to the content provider 166. For example, the content provider 166 can request for general information using the FAQ option. The content provider can navigate through the FAQ options, for example, by drop down menus or additional tab. The content provider 166 can search for information listed or not listed in FAQ list using the search box. In some cases, the content provider 166 can request further help by contacting the administrator via the provided contact information or a chat box (not shown) provided in the UI 300.

The UI 300 can display account information based on an interaction to the account tab 364 by the content provider 166. The UI 300 can display the account information via an account window, which can be a pop-up box or an additional tab. The account information can include information corresponding to the content provider 166, such as name, address, website, content items, or other information to identify the content provider 166 and the content item to search the client device 174. The UI 300 can display a setting option within the account window. The setting option can include various information configuration, such as password, username, website link, content item, or company name.

The UI 300 can include a segment tab 304 to provide content providers 166 with segment selection options. The segment selection options can be provided via a segment selection window 316. The segment selection window 316 can include a browse tab 320 or an idea tab 324. The content provider 166 can select the segment tab 304 to determine whether to select a segment (e.g. via segment selection window 316) based on the browse tab 320 or the ideas tab 324. The browse tab 320 can be similar to the ideas tab with an addition of a search bar 327, as seen in FIG. 3B. The content provider 166 can select the browse tab 320 for manual segment search. In some cases, the content provider 166 can select the ideas tab 324 to automatically populate the segment list 326 with various segments based on the content provider information. The content provider information can include website information, content item, or other information provided by the content provider 166. The data processing system 102 can extract or store the content provider information in a data repository 148.

The UI 300 can include an exclusions tab 308 for the content provider 166 to exclude one or more segments. The exclusions tab 308 can include a window (e.g. segment exclusion window, not shown) similar to the segment selection window 316. The exclusion window can include an exclusion list similar to the segment list 326. The exclusion list can indicate an excluded segment or segments for exclusion. The content provider 166 can determine to exclude a segment by interacting with the exclusion list via a click or a press on the icon or check box. In some cases, UI 300 can display the excluded segment in a different tab from the unselected exclusion segments. For example, the data processing system 102 receive an indication to exclude a segment for a content provider 166 via an interface 110. The data processing system 102 can receive a request for a content item from a client device 174 indicating the excluded segment by the content provider. The data processing system 102 can determine not to provide content items from the content provider 166 to the client device and, instead, can determine to provide other content items from other content providers 166.

Referring more specifically to FIG. 3A, the UI 300 can be displayed via a GUI of a content provider device 166. The content provider 166 can select the segment tab 304 for segment selection to include in a campaign. The campaign can refer to a strategy or a method for providing content items of the content provider 166 to selected segments. The UI 300 can display a segment selection window 316 responsive to the segment tab 304 selection. The content provider 166 can select the ideas tab 324 to display a segment list 326 based on the content provider information. For example, the content provider 166 can include a smart home device webpage link as the content item within the account information under account tab 364. The data processing system 102 can determine to populate the segment list 326 with segments associated with smart home devices, such as smart home segment 328, home content 1 segment 332, home content 2 segment 336, or home content 3 segment 340. The content provider 166 can click, hover, or highlight on the smart home segment 328. The UI 300 can provide a pop-up box 344 of the smart home segment 328. The pop-up box 344 can include various tokens associated with the smart home segment 328. For example, the content provider 166 can view tokens of a smart home segment 328, such as "smart home device", "smart home mini device", "buy smart home device", or "home assistant device". The pop-up box 344 of the UI 300 can include a "more" option for the content provider 166 to view (e.g. via click) more tokens associated with the smart home segment 328. In some cases, all tokens corresponding to the smart home segment 328 can be provided in a list for the content provider 166 to scroll. The segment list 326 can include a "more" option to display additional segments. In some cases, the UI 300 can display all segments in the segment list 326 for the content provider 166 to navigate and search via scrolling down the list.

The UI 300 can provide an option to the content provider 166 to select a token within a segment. The content provider 166 can select the segment, for example, by checking a box (not shown) included in the pop-up box 344. For example, the content provider 166 may determine that three out of five tokens in a segment, shown via a pop-up box 344, should not be included in a segment selection. The content provider 166 can select at least one individual token within the pop-up box 344 to include in a segment selection. In some cases, the UI 300 can display a check mark based on selecting at least one token within a segment, such as seen in check box 333. The content provider 166 can determine to de-select a segment or a token of the segment via initiating a click (or a second click) to the segment icon.

The UI 300 can display an impression count 312 corresponding to the impression range 310. The impression count 312 can include a historical impression value associated with at least the selected segment from the segment list 326 or the impression range 310. For example, the content provider 166 can select the smart home segment 328 with an impression range of last 7 days (e.g. Oct. 25, 2018 to Oct. 31, 2018 in this example). The data processing system 102 can determine the impression count 312 corresponding to the selected smart home segment 328 using feedback data stored in a feedback data structure 162. The feedback data can include a historical data of search queries, redirected link, page visit, or other client device 174 information to determine an impression of the smart home segment 328. The data processing system 102 can utilize a machine learning technique to compute an impression count based on the feedback data. In this example, the data processing system 102 can determine an output of 20,000 impression based on the content provider 166 selection of smart home segment 328 and the impression range of last 7 days.

Referring more specifically to FIG. 3B, the UI 300 can be displayed via a GUI of a content provider device 166, similarly to FIG. 3A. The content provider 166 can select the browse tab 320. The browse tab 320 of the UI 300 can display similar elements to the ideas tab 324 with an addition of a search bar 327. The UI 300 may not display the segment list 326 responsive to the selection of the browse tab 320. The UI 300 can provide a drop-down option (or segment prediction option) similar to populating the segment list 326 responsive to the ideas tab 324 selection. The drop-down option can include various segments or terms suggestion based on the content provider information. For example, the content provider 166 can select the browse tab 320 to manually search for a segment select. The data processing system 102 can provide the UI 300 to the content provider device 166 with a search bar 327. The search bar can include a drop-down menu indicating segments suggestion. The data processing system 102 can perform the segments suggestion via a machine learning technique using a model, similar to the ideas tab 324 selection.

In one example, the content provider 166 can input a set of tokens "stream serv". The data processing system 102 can receive the set of tokens as a search query via an interface 110 to find segments associated to the input set of token. The data processing system 102 can utilize, for example, a metric to compare the input to various clusters stored in the cluster data structure. The data processing system 102 can compare based on definition, structure, or other relevant information linked to the input and the clusters. In further example, the data processing system 102 can provide a segment list 326 of segments for the content provider device 166 to display via a GUI. In this case, the segment list 326 can include a stream provider segment 331, a first content segment 335, a second content segment 339, and a third content segment 343. The segment list 326 can be sorted based on, for example, score (or impression count 312), alphabet, or time stamp associated with the segments or tokens of the segments.

The content provider 166 can select a stream provider segment 331. The UI (e.g. via the data processing system 102) can display a pop-up box 347, listing various tokens included in the stream provider segment 331. The various tokens can include, for example, a "stream provider" token, "stream service" token, "stream movies" token, "stream shows" token, "watch stream" token. In this example, the stream provider segment 331 can include an impression count of 40,000 based on an impression range of 310. The data processing system 102 can determine the impression count 312 via a machine learning technique using a model based on at least a feedback data, the selected segment (e.g. stream provider segment 331), or the impression range 310, similar to FIG. 3A.

The content provider 166 can determine to include the stream provider segment 331 as a segment to provide content items to client device 174. The content provider 166 can interact with a check box 333 of the stream provider segment 331 to include the segment as a campaign. The campaign can refer to a group of segments to provide client device 174 with one or more content items responsive to a hit (or a similarity match between client device 174 search query and the content provider 166 included segment). The UI 300 can display a mark responsive to a segment selection, as seen at check box 333. The mark can be a check, an "x", a segment color change, or other configuration to indicate an inclusion or a selection of the segment. The data processing system 102 can select and provide one or more content items associated to the content provider 166 based on the selected segment. For example, the content provider 166 can click on a segment to include in a campaign. The data processing system 102 can receive the selection via an interface 110 and store the selection in a feedback data structure 162. The data processing system 102 can receive a token or a subset of tokens from a client device 174 via the interface 110. The data processing system 102 can identify correlations (or similarities) between the client device 174 token and the content provider 166 selected segment via a content selector 144. The data processing system 102 can determine to provide a content item of the content provider 166 to the client device 174 for display via a GUI. The data processing system 102 can receive a feedback data from the client device 174 responsive to displaying, viewing, click, or other types of interaction with the content item. In some cases, the data processing system 102 can determine not to provide the content item of the content provider 166 based on the feedback data indicated, for example, the content item has been provided to the client device 174 within a certain time interval. The time interval can be seconds, minutes, hours, or days. In some other cases, the feedback data can indicate a client device 174 previous interaction with the content item, such as website visit, page view duration, mouse hover, or other client device information provided to the data processing system 102.

Figure 4:
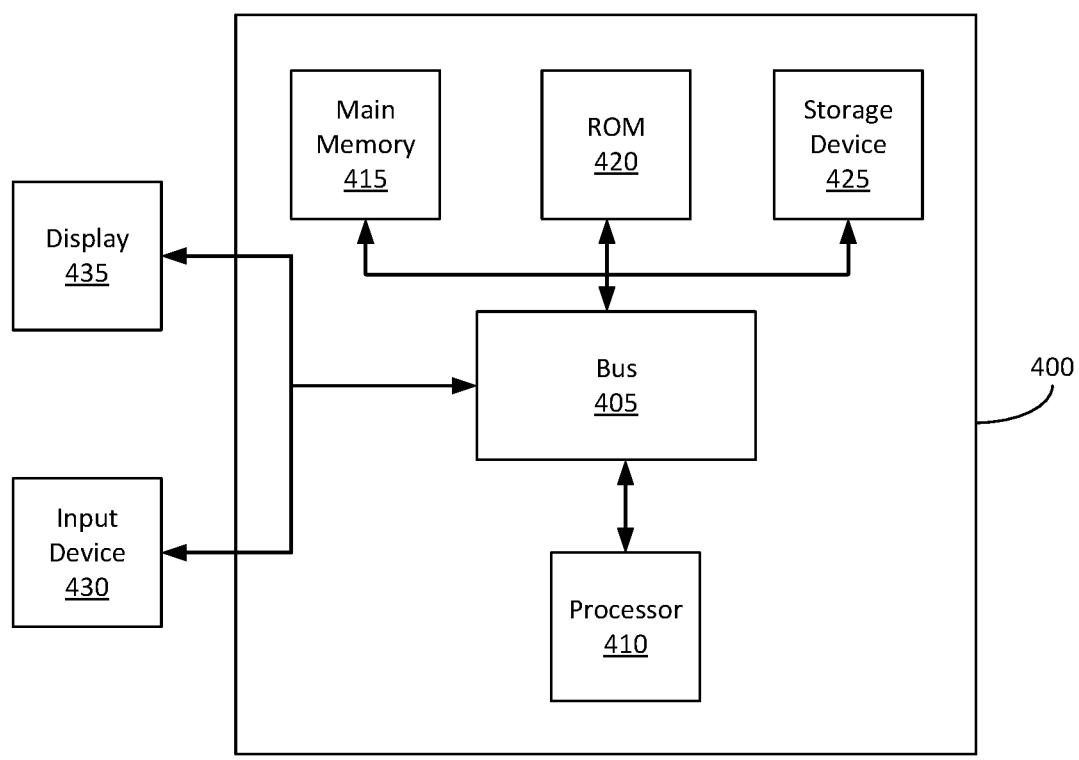
FIG. 4 is a block diagram depicting an example computer system that can be employed to implement various elements of the systems and methods described and illustrated herein.

FIG. 4 is a block diagram of a computer system 400 that can be used to implement the content provider device 166, the client device 174, the content publisher device 178, the data processing system 102 or components thereof, interface 110, token extractor 114, token evaluator 118, cluster generator 122, post-processor 126, label generator 134, cluster activator 138, content selector 144, or data repository 148. The computing system 400 includes a bus 405 or other communication component for communicating information and a processor 410 coupled to the bus 405 for processing information. The computing system 400 can also include one or more processors 410 coupled to the bus for processing information. The computing system 400 also includes main memory 415, such as a RAM or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a ROM 420 or other static storage device coupled to the bus 405 for storing static information and instructions for the processor 410. A storage device 425, such as a solid-state device, magnetic disk or optical disk, is coupled to the bus 405 for persistently storing information and instructions. Computing system 400 may include, but is not limited to, digital computers, such as laptops, desktops, workstations, personal digital assistants, servers, blade servers, mainframes, cellular telephones, smart phones, mobile computing devices (e.g., a notepad, e-reader, etc.) etc.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 104 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the token extractor 114 or the cluster generator 122, can be a single component, app, or program, or a logic device having one or more processing circuits, or part of one or more servers of the data processing system 102.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The token extractor 114, token evaluator 118 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include client devices and servers. A client device and server can be remote from each other and interact through a communication network (e.g., the network 101). The relationship of client device and server arises by virtue of computer programs running on the respective computers and having a client device-server relationship to each other. A server can transmit data (e.g., data packets representing a digital component) to a client device (e.g., for purposes of displaying data to and receiving user input from a user interacting with the client device). Data generated at the client device (e.g., a result of an interaction to the client device) can be received from the client device at the server (e.g., received by the data processing system 102 from the client device 174 or the content provider device 166).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the token evaluator 118 or the cluster generator 122, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. The systems and methods described herein can consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to generate granular clusters for real-time processing, comprising:
a data processing system comprising one or more processors configured to:
identify a plurality of tokens from aggregated input data received via a network from a plurality of computing devices over a time interval;
identify a subset of the plurality of tokens for cluster generation;
generate a plurality of token clusters from the subset of the plurality of tokens, each of the plurality of token clusters comprising two or more tokens from the subset of the plurality of tokens;
de-duplicate each of the plurality of token clusters;
filter, based on a query hits metric, the plurality of token clusters to remove tokens erroneously grouped in a token cluster of the plurality of token clusters;
assign a label for each of the plurality of token clusters;
select, based on a number of remaining tokens in each of the plurality of token clusters, a subset of the plurality of token clusters; and
transmit the subset of the plurality of token clusters for real-time content selection via the network.

2. The system of claim 1, wherein the data processing system is further configured to:
apply a weight to at least one of a plurality of metrics comprising a coherence metric, a granularity metric, a coverage metric, a stability metric, a freshness metric, and a readability metric; and
generate the subset of the plurality of tokens based on the weight applied to the at least one of the plurality of metrics.

3. The system of claim 1, wherein the data processing system is further configured to:
generate the plurality of token clusters based on a distance metric between tokens of the subset of the plurality of tokens.

4. The system of claim 1, wherein the data processing system is further configured to generate the plurality of token clusters via hierarchical agglomerative clustering, K-means clustering, or min-max clustering.

5. The system of claim 1, wherein the data processing system is further configured to:
generate the plurality of token clusters using a hierarchical agglomerative clustering technique configured to perform at least one of complete linkage, single linkage, or group average linkage.

6. The system of claim 1, wherein the data processing system is further configured to:
subsequent to generation of the plurality of token clusters, de-duplicate the plurality of token clusters via white space removal, bag of tokens removal, bag of stemmed tokens removal, entity removal, or similar meaning removal.

7. The system of claim 1, wherein the data processing system is further configured to:
identify a plurality of candidate labels for each of the plurality of token clusters;
determine a score for each of the plurality of candidate labels; and
select a highest scoring label from the plurality of candidate labels as the label for each of the plurality of token clusters.

8. The system of claim 1, wherein the data processing system is further configured to:
determine that the number of remaining tokens in a first token cluster of the plurality of token clusters is less than or equal to a threshold; and
disable the first token cluster of the plurality of token clusters to prevent the first token cluster from display via a graphical user interface.

9. The system of claim 1, wherein the data processing system is further configured to:
determine that the number of remaining tokens in a first token cluster of the plurality of token clusters is greater than or equal to a threshold;
identify a plurality of highest scoring tokens in the first token cluster; and
activate the first token cluster and the plurality of highest scoring tokens for display via a graphical user interface.

10. The system of claim 1, wherein the query hits metric is based on a query hit count for a first token, and wherein the query hit count includes a number of times a client device input the first token.

11. A method of generating granular clusters for real-time processing, comprising:
identifying, by one or more processors of a data processing system, a plurality of tokens from aggregated input data received via a network from a plurality of computing devices over a time interval;
identifying, by the one or more processors, a subset of the plurality of tokens for cluster generation;
generating, by the one or more processors, a plurality of token clusters from the subset of the plurality of tokens, each of the plurality of token clusters comprising two or more tokens from the subset of the plurality of tokens;
de-duplicating, by the one or more processors, each of the plurality of token clusters;
filtering, based on a query hits metric by the one or more processors, the plurality of token clusters to remove tokens erroneously grouped in a token cluster of the plurality of token clusters;
assigning, by the one or more processors, a label for each of the plurality of token clusters;
selecting, by the one or more processors based on a number of remaining tokens in each of the plurality of token clusters, a subset of the plurality of token clusters; and
transmitting, by the one or more processors, the subset of the plurality of token clusters for real-time content selection via the network.

12. The method of claim 11, further comprising:
applying a weight to at least one of a plurality of metrics comprising a coherence metric, a granularity metric, a coverage metric, a stability metric, a freshness metric, and a readability metric; and
generating the subset of the plurality of tokens based on the weight applied to the at least one of the plurality of metrics.

13. The method of claim 11, further comprising:
generating the plurality of token clusters based on a distance metric between tokens of the subset of the plurality of tokens.

14. The method of claim 11, further comprising generating the plurality of token clusters via hierarchical agglomerative clustering, K-means clustering, or min-max clustering.

15. The method of claim 11, further comprising:
generating the plurality of token clusters using a hierarchical agglomerative clustering technique configured to perform at least one of complete linkage, single linkage, or group average linkage.

16. The method of claim 11, further comprising:
de-duplicating, subsequent to generation of the plurality of token clusters, of the plurality of token clusters via white space removal, bag of tokens removal, bag of stemmed tokens removal, entity removal, or similar meaning removal.

17. The method of claim 11, further comprising:
identifying a plurality of candidate labels for each of the plurality of token clusters;
determining a score for each of the plurality of candidate labels; and
selecting a highest scoring label from the plurality of candidate labels as the label for each of the plurality of token clusters.

18. The method of claim 11, further comprising:
determining that the number of remaining tokens in a first token cluster of the plurality of token clusters is less than or equal to a threshold; and
disabling the first token cluster of the plurality of token clusters to prevent the first token cluster from display via a graphical user interface.

19. The method of claim 11, further comprising:
determining that the number of remaining tokens in a first token cluster of the plurality of token clusters is greater than or equal to a threshold;
identifying a plurality of highest scoring tokens in the first token cluster; and
activating the first token cluster and the plurality of highest scoring tokens for display via a graphical user interface.

* * * * *